(12) United States Patent
Debergh et al.

(10) Patent No.: US 12,721,376 B2
(45) Date of Patent: Sep. 1, 2026

(54) AEROSOL-GENERATING SYSTEM AND DEVICE HAVING A WAVEGUIDE ARRANGEMENT FOR AUTHENTICATING AEROSOL-GENERATING ARTICLES

(71) Applicant: JT International SA, Geneva (CH)

(72) Inventors: Patrick Debergh, Cressier (CH); Matteo Bruna, Geneva (CH)

(73) Assignee: JT International SA, Geneva (CH)

( * ) Notice: Subject to any disclaimer, the term of this patent is extended or adjusted under 35 U.S.C. 154(b) by 957 days.

(21) Appl. No.: 17/787,740

(22) PCT Filed: Dec. 15, 2020

(86) PCT No.: PCT/EP2020/086116

§ 371 (c)(1),
(2) Date: Jun. 21, 2022

(87) PCT Pub. No.: WO2021/122525

PCT Pub. Date: Jun. 24, 2021

(65) Prior Publication Data

US 2023/0079458 A1 Mar. 16, 2023

(30) Foreign Application Priority Data

Dec. 20, 2019 (EP) .................................... 19218946
Jan. 30, 2020 (EP) .................................... 20154684

(51) Int. Cl.
*A24F 40/53* (2020.01)
*A24D 1/20* (2020.01)
(Continued)

(52) U.S. Cl.
CPC ................ *A24F 40/53* (2020.01); *A24D 1/20* (2020.01); *A24F 40/20* (2020.01); *A24F 40/46* (2020.01);
(Continued)

(58) Field of Classification Search
CPC .......... A24F 40/53; A24F 40/46; A24F 40/20; A24F 40/57; A24F 40/51; A24D 1/20; G02B 6/0006; G02B 6/001
See application file for complete search history.

(56) References Cited

U.S. PATENT DOCUMENTS 9,261,403 B2 * 2/2016 Walton .................. G01J 3/0291
11,064,739 B2 * 7/2021 Gimkiewicz ........ G06V 30/224
(Continued)

FOREIGN PATENT DOCUMENTS

CN 107708455 A 2/2018
CN 108576937 A 9/2018
(Continued)

OTHER PUBLICATIONS

Buonocore F, et al., Labelling of electronic cigarettes: regulations and current practice, Tob Control 2017;26:46-52. doi:10.1136/tobaccocontrol-2015-052683 (Year: 2017).*
(Continued)

*Primary Examiner* — Peter Radkowski
(74) *Attorney, Agent, or Firm* — Lerner David LLP

(57) ABSTRACT

An aerosol-generating system comprises an aerosol-generating article having an indicium arranged on an outer surface thereof and an aerosol-generating device usable with the article. The aerosol-generating device includes a cavity, a heater, and an optical reader system. The cavity has an opening accessible at the outer body part and is configured to receive a consumable article comprising an indicium arranged on the article. The optical reader system includes at least one waveguide that has an incoupling surface, an outcoupling surface, and a detector. The waveguide is configured to illuminate the indicium in the cavity with a light beam and to transmit a reflected light beam provided by the indicium to the detector (30) of the optical reader system. A
(Continued)

related method for authenticating a consumable article is also provided.

20 Claims, 10 Drawing Sheets

(51) Int. Cl.

| | |
|---|---|
| ***A24F 40/20*** | (2020.01) |
| ***A24F 40/46*** | (2020.01) |
| ***A24F 40/51*** | (2020.01) |
| ***A24F 40/57*** | (2020.01) |
| ***F21V 8/00*** | (2006.01) |

(52) U.S. Cl.

CPC .............. *A24F 40/51* (2020.01); *A24F 40/57* (2020.01); *G02B 6/0006* (2013.01); *G02B 6/001* (2013.01)

(56) References Cited

U.S. PATENT DOCUMENTS

| | | | | |
|---|---|---|---|---|
| 2005/0279354 | A1 | 12/2005 | Deutsch et al. | |
| 2009/0261166 | A1 * | 10/2009 | Lawson | H04W 88/02 235/449 |
| 2010/0176200 | A1 * | 7/2010 | Vollmer | G01N 21/774 356/402 |
| 2013/0155402 | A1 * | 6/2013 | Walton | G01J 3/0272 356/326 |
| 2013/0342210 | A1 * | 12/2013 | Stokely | E21B 47/022 324/346 |
| 2014/0140655 | A1 * | 5/2014 | Chakravarty | G01N 21/7746 385/12 |
| 2015/0355089 | A1 * | 12/2015 | Takase | G01N 29/225 422/82.11 |
| 2016/0169180 | A1 * | 6/2016 | McAlister | F02M 61/08 239/584 |
| 2016/0302488 | A1 | 10/2016 | Fernando et al. | |
| 2017/0205618 | A1 | 7/2017 | Basset et al. | |
| 2018/0280651 | A1 * | 10/2018 | Liu | A61M 16/0891 |
| 2018/0284020 | A1 * | 10/2018 | Vauclin | G01N 21/55 |
| 2018/0307958 | A1 * | 10/2018 | Lawson | G06K 7/10712 |
| 2019/0008206 | A1 * | 1/2019 | Gimkiewicz | A24F 40/40 |
| 2019/0156083 | A1 * | 5/2019 | Khbeis | G06K 7/10366 |
| 2019/0191783 | A1 * | 6/2019 | Courbat | A24D 1/20 |
| 2019/0356047 | A1 * | 11/2019 | Guduru | A24F 40/46 |
| 2023/0080496 | A1 | 3/2023 | Kogure | |

FOREIGN PATENT DOCUMENTS

| | | | | | |
|---|---|---|---|---|---|
| CN | 109688850 | A | | 4/2019 | |
| GB | 2398759 | A | * | 9/2004 | G07D 7/206 |
| JP | H06217934 | A | | 8/1994 | |
| JP | H08075942 | A | | 3/1996 | |
| JP | H09245113 | A | | 9/1997 | |
| JP | 2007179623 | A | | 7/2007 | |
| JP | 2013536950 | A | | 9/2013 | |
| JP | 2016206520 | A | | 12/2016 | |
| JP | 2018527894 | A | | 9/2018 | |
| JP | 2019020723 | A | | 2/2019 | |
| WO | WO-2017029088 | A1 | * | 2/2017 | A24F 40/20 |
| WO | 2017186477 | A1 | | 11/2017 | |
| WO | 2019129378 | A1 | | 7/2019 | |
| WO | 2019185747 | A1 | | 10/2019 | |
| WO | 2019185749 | A1 | | 10/2019 | |
| WO | 2019198553 | A1 | | 10/2019 | |

OTHER PUBLICATIONS

Tittl et al. Imaging-based molecular barcoding with pixelated dielectric metasurfaces,, Science 360, 1105-1109 (Year: 2018).*

Tabassum et al., Heater integrated nanopatterned optical fiber-tip to realize a reusable gas sensor, Proc. SPIE 10755, Photonic Fiber and Crystal Devices: Advances in Materials and Innovations in Device Applications XII, 107550G (Sep. 4, 2018); https://doi.org/10.1117/12.2319440 (Year: 2018).*

International Search Report for Application No. PCT/EP2020/086116 mailed Mar. 15, 2021, pp. 1-4.

Bryngdahl. O. "Image formation using self-imaging techniques*" Journal of the Optical Society of America, Apr. 1973, pp. 416-419, vol. 63, No. 4.

Fertman A. et al., "Image transmission through an optical fiber using real-time modal phase restoration" Optical Society of America, Jan. 2013, pp. 149-157, vol. 30, No. 1.

Caramazza. P. et al., "Transmission of natural scene images through a multimode fibre" Nature Communications, School of Physics and Astronomy, University of Glasgow, Apr. 2019, pp. 1-6, vol. 10.

Feshchenko. V.S. et al., "Optical Imaging System with a Waveguide" Physical and Quantum Optics, Optics and spectroscopy, Mar. 2004, pp. 468-471, vol. 97, No. 3.

Sharon. A. et al., "Resonant grating-waveguide structures for visible and near-infrared radiation" Journal of the Optical Society of America, Nov. 1997, pp. 2985-2993, vol. 14, No. 11.

Office Action for Chinese Application No. 202080088826.1 issued Mar. 11, 2025. 13 pages.

Pan Yingjun and Zou Jian, Optoelectronic Technology 2nd Edition, p. 180, Chongqing University Press, Feb. 2010. 3 pages (See Chinese Office Action for Application No. 202080088826.1 issued Mar. 11, 2025 for concise explanation of relevance).

* cited by examiner 30
250
10
2
1
20
1a
4
4'
20'
30'
10'

10
20
2
21
λ
$I_{In}$
1b
1
1a
4
10
50
$I_{Out}$

λ

L
I
3
O
10 10"
30
1
11
10'
250
2a
Y
Z
X
4
2a
3
2

10"
I
100
2
10
10'
t1
3
2a
tG
1
11
4
1
1

O
2
30
100
13a
t2
13
t1
13b

AEROSOL-GENERATING SYSTEM AND DEVICE HAVING A WAVEGUIDE ARRANGEMENT FOR AUTHENTICATING AEROSOL-GENERATING ARTICLES

CROSS-REFERENCE TO RELATED APPLICATIONS

The present application is a national phase entry under 35 U.S.C. § 371 of International Application No. PCT/EP2020/086116, filed on Dec. 15, 2020, published in English, which claims priority from European Application No. 19218946.2, filed on Dec. 20, 2019, and from European Application No. 20154684.3, filed on Jan. 30, 2020, the disclosures of which are incorporated herein by reference.

TECHNICAL FIELD OF THE INVENTION

The present invention relates to the field of aerosol-generating products. The present invention more specifically relates to an aerosol generating system comprising electrically powered devices configured to generate an aerosol from a solid and/or liquid aerolizable substrate insertable in the devices, especially to an electrically heated e-liquid system or an electrically heated aerosol-generating system.

BACKGROUND OF THE INVENTION

Electronic cigarettes based on aerosol-generating consumable articles have gained popularity in the recent years. There are mainly two types: liquid vaporizers and heated tobacco inhaler devices. Heated tobacco inhaler devices are referred to as "heat-not-burn" systems (HNB). They provide a more authentic tobacco flavour compared to electronic cigarettes, which deliver an inhalable aerosol from heating of a liquid charge comprising aerosol formers, flavorants, and often nicotine. The HNB systems' working principle is to heat a substantially solid tobacco-containing material comprising an aerosol-forming substance (such as glycerine and/or propylene glycol), which vaporises during heating to between 200 and 400° C., which is below the normal burning temperatures of a conventional cigarette and creates a vapour that extracts nicotine and flavour components from the tobacco-containing material. The inhaler device is typically a hand-held heater, which is configured to receive consumable articles, in particular rod-shaped articles.

Illicit trade of aerosol-generating articles, be it standard cigarettes, e-liquids, or HNB articles, is a problem, as counterfeit articles in particular may be of inferior quality or, in the case of e-liquids or HNB consumable articles, may not be suited to a determined smoking system. In order to identify if an aerosol-generating consumable article is an authentic one a code or equivalent marking containing information about the article may be arranged on an outer surface of the article, for it to be detected in use or prior use with a certain device. This allows to check for authenticity of the consumable article and in case of negative check, to power off the heating system with which it is used. To provide accurate authentication of a code on a consumable article such as an HNB article, the recognition probability should be very high so that suitable articles will not be rejected. However, existing indicia are limited by the low density of information that may be contained in them, and most known indicia rely on classic codes such as 1-dimensional or 2-Dimensional barcodes that may be easily be copied without using specific optical instruments, for example by simply visualizing the code by the human eye.

Various attempts at providing authenticatable aerosol-generating articles have been proposed in the prior art already. For instance, US20190008206A1 discloses a smoking article comprising an indicium on an outer surface of the smoking article and represents a type of smoking article and may be in the form of pattern or one/two-dimensional barcode. The indicium includes different grey levels that can be generated by printing in dots which have smaller size. Such indicium is easily detectable and reproducible and may contain only a small density of information or should be provided with an unacceptably large size. Due to the lack of space the system described in US20190008206A1 is limited to simple optical readers having a detector in proximity of the indicium. Also, the optical reader of US20190008206A1 cannot be used in proximity of the heater of the device because of possible damage to the detector of the reader, which limits the locations on the smoking article to arrange an indicium.

In US20160302488A1, a smoking article is described that comprises an indicium on an outer surface of the smoking article. The indicium may be in the form of one/two dimensional barcodes. The code comprises an identifiable spectroscopic signature of a layer of the indicium that is applied by a spray. The spectroscopic signature is detected by an optical reader which is a simple optical reader arranged in a very limited space and close to the cavity of the smoking device. Because of the lack of place only simple optical filters can be used, so the system described in US 20160302488 A1 is limited to detect only simple spectra or colors or is limited to using one or more narrow band filters. The spectral effects provided by the system of US 20160302488 A1 therefor is easy to copy or replicate In WO 2019129378A1 an aerosol-generating consumable article is described for an inhaler comprising an indicium containing information about a consumable. The information is read by an optical reader which is a simple detector system because of the lack of place. Also, the device in WO 2019129378 A1 relates to systems wherein the heater is configured at a central axis of a cavity for introducing a consumable article. An inhaler is also described including an optical reader system that reads the indicia on the consumable. The indicia is in the form of a simple one-dimensional or two-dimensional barcode. The system would not be suitable for heaters arranged at or in the wall of the cavity because optical detectors may be damaged by high temperatures. Also, due to the configuration of the device in WO 2019129378 A1 the indicia can only be of a simple code that may be easily copied as visible by the unaided human eye.

There is thus a need for an improved technique to allow authentication of aerosol-generating articles such as HNB, vaping and smoking articles. In particular, authentication based on codes or indicia comprising a much higher information density would be preferable to improve authentication quality and harden counterfeiting of the articles. Also, it is furthermore desirable that at least the detector part of optical readers is maintained lower than 50° C., typically at room temperatures Systems of prior art are limited to simple codes because only simple optical readers can be used and require an indicium that cannot be in close proximity of the heater of the smoking device.

SUMMARY OF THE INVENTION

The inventors of the present invention have found solutions to the above-discussed problems by providing an aerosol-generating system comprising an aerosol-generating device that has an improved arrangement of an optical reader in the very confined space available in such an aerosol-generating device. Furthermore, in embodiments, the invention allows to provide indicia that may be arranged in proximity of the heater of a smoking device. The device of the invention additionally allows providing a solution to detect and identify information contained in indicia that may comprise high density coded information and that cannot be read by a simple optical reader that cannot be placed in proximity of in contact with the cavity of a smoker device arranged to accept an article comprising such indicium.

The current invention thus relates to an aerosol-generating system as defined in independent claim 1. The inventive aerosol-generating system comprises an aerosol-generating article, also called consumable article in the following, which extends along a longitudinal axis and comprises at least one indicium containing information about the article arranged on a surface thereof. The aerosol-generating system further comprises an aerosol-generating device comprising, arranged in an outer body part, a power supply section, a cavity, a heater, an optical reader system and comprises at least one optical detector, and a control unit configured to command at least the heater and optical reader system. The cavity has an opening accessible at the outer body part and being configured to receive a consumable article comprising an indicium arranged on a surface of said article upon insertion of said article, and the heater is arranged to heat said consumable article.

According to the invention, the optical reader system comprises at least one waveguide comprising an incoupling surface and an outcoupling surface. The aerosol-generating device is configured to illuminate said indicium on the aerosol-generating article with an illuminating light beam, such that the indicium interacts with the incident light and reflects at least a portion of the illuminating light to said incoupling surface and, by guiding the incoupled light, transmits the guided light to the outcoupling surface that is arranged to outcouple a light beam to said at least one detector. The control unit is configured to command the optical reader system to authenticate said consumable article based on information contained in the reflected light beam.

In embodiments, an incoupling structure may be arranged at the incoupling surface of the waveguide. Similarly, an outcoupling structure may further be arranged at the outcoupling surface of the waveguide.

In such cases, at least a portion of said incoupling structure and/or outcoupling structure may be chosen among: a diffractive structure, a flat or curved wedged portion of the waveguide, an array of microprisms, a hologram layer, a metasurface, an electrostatic addressable micromirror or microshutter array, a lens, a mirror. In preferred embodiments diffractive structures are used for the incouplers and outcouplers as they may be integrated onto a portion of a surface of the waveguide during the same fabrication process of the waveguide. Diffractive incouplers and outcouplers may be designed to incouple or outcouple light into or out of the waveguide with relatively poor efficiency, i.e. no larger than 60% or no larger than 80%. More preferably diffractive in- or outcouplers are designed to have an optical function such as a focusing function so that imaging may be achieved without lenses. Furthermore, diffractive incouplers may incouple light into the waveguide so that a central optical axis of an incoupled light beam makes an angle relative to a normal direction to the diffractive incoupler. In variants, light may incoupled according to various orders of diffraction, i.e. +1 or −1, or +2 or −2 orders of diffraction. In further variants, a single diffractive incoupler may couple light into the waveguide so that it propagates according to two opposite guided beams that are each outcoupled by two separate outcouplers. This may be used to identify indicia that provide information according to opposite polarisation directions, and each of the polarized optical beams may then be outcoupled by at least two diffractive outcouplers and be detected by at least two separate detectors, thereby providing extremely secure authentication.

Further, such incoupling structure and/or outcoupling structure may be configured for focusing and/or deviating, in at least one plane (X-Y, X-Z, Y-Z) a light beam incident on said incoupling structure and/or outcoupling structure.

In an embodiment, the incoupling structure and/or said outcoupling structure is an achromatic structure providing the same incoupling, respectively outcoupling efficiency and/or focusing in a spectral band of at least 50 nm, preferably at least 100 nm, more preferably at least 200 nm.

In$_{[BE1]}$ some embodiments, said incoupling structure and/or said outcoupling structure has a focal length equal or greater than the length L of the waveguide. Preferably, the length L of the waveguide is less than 100 mm, preferable less than 60 mm, even more preferably less than 30 mm. The thickness of the waveguide is less than 500 μm, preferable less than 100 μm, even more preferably less than 50 μm, or less than 20 μm. In embodiments said incoupling structure and/or said outcoupling structure has a focal length smaller than the length L of the waveguide. In that case advantageous embodiments provide waveguides that have absorbing or diffusing walls so that the total reflection occurs on the thin walls of the waveguide and total reflection only occurs on the walls having the largest width. In embodiments the thickness of the waveguides is less than 1/10th, preferably less than 1/50th of the width of the waveguides as measured perpendicularly to a length L thereof.

In embodiments, the waveguides have a parabolic index profile so that images may be transmitted more efficiently or with less image distortion.

In embodiments, waveguides may have a Y-shape and have one incoupling branch and at least two outcoupling branches. This provides for detection of complex information, such as information provided by two differently polarised light beams from an indicium.

In embodiments, incouplers and/or outcouplers may be configured to provide an optical function, such as that of a cylindrical lens. Incouplers and outcouplers that have a focus only in one plane provide a solution for detecting one-dimensional codes and allow to not be concerned with total reflection at the lateral thin walls of the waveguides.

In advantageous embodiments the waveguides are rigid or flexible hollow waveguides. This allows to guide light over distances smaller than typically 1 m and so that light may be guided that has a wide spectral distribution, such as visible and infrared light because the index of refraction is substantially 1 if the hollow core is vacuum, or a gas such as air.

In variants, cores and/or claddings of hollow waveguides may be composed of at least two layers. The mechanical and optical properties of the waveguide may be non-uniform along the length of a waveguide. In variants a waveguide may be arranged in a solid or flexible tube.

In other embodiments, said incoupling structure and/or said outcoupling structure has a focal length smaller than the length L of the waveguide and wherein focusing structures are arranged to at least one side of the waveguide, said focusing structures being configured as relay structures to transmit an image from at least a portion of said indicium to the outcoupling surface or out of the waveguide to a distance from the output surface.

In an embodiment said waveguide is an optical fibre or an optical fibre bundle. Using fibre optics allows to provide very cheap and commercially available waveguides that can be easily wrapped and positioned in or through narrow spaces or apertures.

In an embodiment said waveguide is a flat optical waveguide and may be a flexible waveguide. Using a flat optical waveguide allows to transmit from an outcoupled surface to an outcoupled surface an image.

The waveguide of the aerosol-generating device of the current invention can be made of different materials, depending on design and performance needs of the device, as well as characteristics of the indicium to be read onto the aerosol-generating article. The waveguide can for instance be made at least partially of: a polysiloxane, a polymer comprising imide groups, polyamide-imides or polyimides.

In an embodiment an optical focusing element is arranged between said cavity and said incoupling surface. Using focusing elements arranged between an indicium and an incoupling surface of a waveguide allows to project at least a partial image of an indicium onto said incoupling surface.

In an embodiment said optical focusing element is part of said waveguide. Integrating a focusing elements onto or into a waveguide allows to provide a monolithic component that focuses and guides light into a waveguide. Such monolithic arrangement reduces the required space and the costs of an optical reader and improves the stability and reliability of an optical reader.

In an embodiment said waveguide is arranged to transmit an enlarged image of at least a portion of said indicium onto said outcoupling surface or outside the waveguide. By using a waveguide that provides an enlargement of the guided light beam allows to avoid using additional optical elements to realize a magnification. Such arrangement reduces the required space and the costs of an optical reader and improves the stability and reliability of an optical reader.

In an embodiment said waveguide is at least partially wrapped around a length of said cavity. A wrapped waveguide allows providing solutions wherein a large length of guided light is required. A wrapped waveguide allows to provide the possibility to comprise more than one incoupling surface and/or outcoupling surface of a waveguide and also provides the possibility to arrange multiple indicia allow such waveguide.

In an embodiment at least a portion of said waveguide is configured to transmit light provided by an emitter to said indicium. By configuring the waveguide or waveguide bundle so that it can also transmit light to an indicium allows to avoid illuminating optical elements arranged between a light source and an indicium. It allows also to provide a light source that does not need to be arranged in proximity of an indicium.

In an embodiment, at least a portion of said waveguide is realized onto at least one of the surfaces of the heater of the heater system.

In an embodiment said detector is a detector array. Using a detector array provides the possibility to detect a plurality of intensity or colour effects provided by the indicium.

In an embodiment at least one optical filter is arranged between said outcoupling surface and said detector. Using an optical filter allows to detect colour or spectral effects provided by an indicium.

In an embodiment an optical spectrometer is arranged between said output surface and said detector. Using an optical spectrometer allows to detect narrow spectral effects provided by an indicium.

In an embodiment said detector comprises an image processor. Using a detector comprising an image processor allows to provide images of at least a portion of an indicium.

A second aspect of the present invention further relates to a method for authenticating a consumable article and comprises the steps of:

- providing an aerosol generating device as described above and a consumable article comprising an indicium arranged on an outer surface,
- inserting at least a portion of the consumable article comprising the indicium in the cavity of the aerosol generating device,
- illuminating the indicium on the outer surface of the consumable article and collecting reflected light from the indicium through the waveguide and guiding said reflected light to the detector of the optical reader system,
- authenticating the consumable article by computing information contained in the reflected light impinging on the detector in the control unit.

In an embodiment the method further comprises a step of commanding the heater with the control unit based on the information computed in the authentication step.

DETAILED DESCRIPTION OF THE INVENTION

Figure 1:
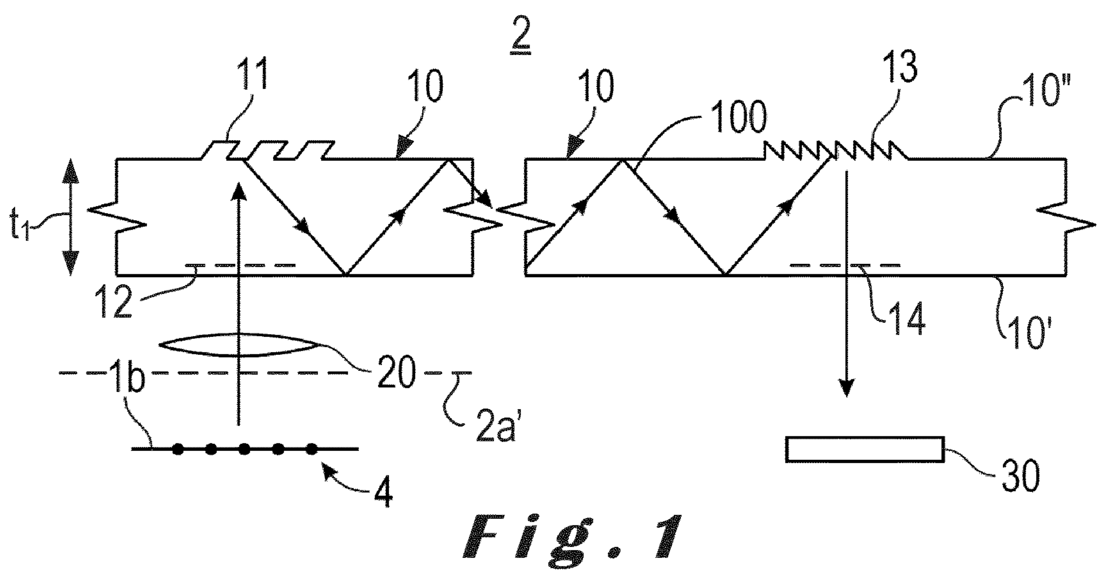
FIG. 1 shows a schematic cross section of a waveguide comprising a diffractive incoupling structure and a diffractive outcoupling structure.

The present invention relates to an aerosol-generating article 1, an aerosol-generating device 2 and a system comprising the article 1 and the device 2.

The present invention will be described with respect to particular embodiments and with reference to the appended drawings, but the invention is not limited thereto. The drawings described are only schematic and are non-limiting. In the drawings, the size of some of the elements may be exaggerated and not drawn on scale for illustrative purposes. The dimensions and the relative dimensions do not correspond to actual reductions to the practice of the invention.

The invention will be described in the following examples in relation to tobacco-based consumable articles 1 but the scope of the invention shall not be construed as limited to tobacco-based consumable articles but shall encompass any aerosol-generating consumable articles, such as smoking articles, heat-not-burn articles, e-liquid cartridges and cartomizers, which comprises an aerosol-generating substrate capable to generate an inhalable aerosol upon heating. Tobacco-based consumable articles have not necessarily a symmetry axis and may have any form or shape, such as an elongated shape such as cylindrical shape, or a spherical shape, or the form of a beam. Tobacco-based consumable articles 1 of the invention comprise at least one portion 1*b* to which an indicium 4 is arranged and comprises a portion 1*a* to the side of the smoker. The article 1 comprises a further portion 1*c* that does not comprise an indicium 4. The indicium 4 may be arranged to at least one of the sides of said further portion 1*c*.

As used herein, the term "aerosol-generating material" refers to a material capable of releasing an aerosol stream comprising volatile compounds upon heating. The aerosol generated from aerosol-generating material of aerosol-generating articles described herein may be visible or invisible and may include vapours (for example, fine particles of substances, which are in a gaseous state, that are ordinarily liquid or solid at room temperature) as well as gases and liquid droplets of condensed vapours.

As used herein, the term "diffractive structure" refers to a structure comprising diffractive elements or diffractive structures. Diffractive structures are defined broad and encompass meta-surfaces.

As used herein, the term "holographic" refers to elements or layers that behave as a hologram upon illumination with light.

As used herein the term "incoupling" and "outcoupling" refer to the incoupling of light into, respectively out of, a waveguide. The incoupling is realized by an incoupler 11. The outcoupling is realized by an outcoupler 13. As used herein incouplers and outcouplers are part of the waveguide 10. Preferably the incoupler 11 and outcoupler 13 are structural portions of the waveguide 10. For example, said structural portion may be a wedge-shaped portion or may be a diffractive or any refractive, reflective or transmission structure. It is understood that the incoupling and/outcoupling of light may be performed by a non-structured area 12, 14 of the waveguide, which is a simpler solution but has lower incoupling and outcoupling efficiency compared to the case wherein an incoupler 11 or outcoupler 13 is provided, such as with a diffractive incoupler 11 or outcoupler 13 The incoupler 11 and/or outcoupler 13 may be the non-structured area 12, 14 of the waveguide. Also, an incoupling surface or area 12, 14 may be an edge (FIG. 3) of a waveguide 10 or any curved or non-curved portion of a lateral surface of the waveguide 10. Said incoupling provides at least one guided light beam 100, that may be a monomode or multimode light beam that propagates inside the waveguide 10 to the outcoupling surface 14 or outcoupler 13 of the waveguide 10. Incoupling elements 20 and outcoupling elements are defined as elements that are not part of the waveguide 10 but are elements positioned outside the waveguide 10 and fit to improve the incoupling and outcoupling of light into and out of a waveguide 10. Incoupling elements and outcoupling elements may be identical elements and may be, without limitation, optical lenses, prisms or mirrors or a combination of them. Incoupling elements and outcoupling elements may be arrays of optical elements such as an array of microprisms. Incoupling elements 20 and outcoupling elements may be electrical addressable elements Incoupling and outcoupling elements may be addressable elements, such as for example MEMS mirror fit to be scanned or switched or an electro-optic element.

As used herein, the term "waveguide system", defined also as optical reader system refers to a subsystem of an aerosol generating device 2 that comprises an optical detector and at least one waveguide arranged to collect optical information provided by a smoking article and that is configured to transmit that optical information to said detector. A waveguide system may comprise optical incoupling elements and/or optical outcoupling elements that are separate from the waveguide 10, or integrated onto or into the waveguide 10.

The term "longitudinal axis of a waveguide 10" is defined as a central virtual axis of the waveguide 10 defined in the direction of the guidance of an optical light beam 100 in the waveguide 10. Optical guidance may be performed by total internal reflection (TIR) or by using reflecting or diffracting layers or structures.

The term "indicium 4" is defined as an element or a structure containing information about a smoking article and is typically arranged on an outer surface of an article. An indicium 4 may be imbedded inside the article 1. The indicium 4 may be of different types, some of which are described in further details below. Typical classes of indicia 4 applicable to the aerosol-generating articles 1 according to the invention comprise, but are not limited to:

- a reflecting indicium 4;
- a diffracting indicium 4;
- a reflecting and diffracting indicium 4;
- an indicium 4 that comprises at least one indicium waveguide; The term "indicium waveguide" means a waveguide, such as a resonating waveguide grating that is arranged on or in the indicium 4 of an article and is different than the waveguide 10 of the aerosol generating device as describe herein;
- an indicium 4 comprising at least one indicium resonating waveguide 10;
- a partially transparent indicium 4;
- indicia that are organized or distributed chemical substances imbedded in the article
- a combination of different types of said typical classes of indicia 4.

An indicium 4 as described herein may be arranged to provide predetermined direct reflection effects such as providing, upon illumination by a light beam 400, a plurality of light beams that may have different spectra and/or different reflection angles. For reasons of clarity of the Figures, the illumination light beam 400 or light beams are not represented in all Figures. The reflected light beams may be diffracted light beams projected in any diffraction order. An indicium 4 may comprise structures on at least one of its surfaces or sides and may comprise structures imbedded inside a layer of the indicium 4. For example, diffractive structures may be provided on an outer surface of the indicium 4. Light beams as described herein may be collimated light beams or may be large aperture light beams and may be divergent or convergent light beams. Light as described herein may be high energy light having a wavelength of less than 180 nm, or UV light (i.e. UVA or UVB or UVC ranges of UV light having wavelengths greater than 180 nm), visible light, infrared light or terahertz waves or even microwaves. Waveguides may be hollow waveguides to guide high energy light or microwaves.

Indicia must not be necessarily be codes in the form of physical structures such as barcodes but may be chemical substances that provide a spectral signature upon illumination with a light beam 400. In such cases the waveguide 10 of the device 2 may be used to transmit only spectral information of the light reflected or refracted from the chemical substance of the indicium 4, i.e. without requiring the transmission of an image of the indicium 4.

Preferably, but not necessarily so, code elements or structures of the indicium 4 are individually difficult or impossible to detect or identify by the human eye so that the indicium may not be easily be read or copied without using an optical system. An indicium 4 may be arranged according to a 2D or 3D arrangement of structures and may have any shape such as a square, or a rectangular shaped band that may be arranged on a complete circumference of the outer surface 5 of an article 1. Apart from anti-counterfeit properties it is desired that the indicium 4 may also contain information of specific parameters that should be used by the inhaler devices such as the ideal temperature range, or the heating profile in function of time, or parameters which allow to provide to the smoker different smoking tastes or intensities.

The use of waveguides 10 allows providing aerosol generating devices 2 that may be arranged according to different types of indicia 4 as described. It further allows to provide great design flexibility of such aerosol generating devices 2, coping with issues such as extremely limited available space and heating issues of the components of the needed optical reader system.

As used herein, the term "incoupling surface 12" has to be understood as an area through which light enters, through an area of the waveguide 10, into a waveguide. The area may be a virtual surface at which an incoupler 11 is arranged such as, without any limitation: a refractive, diffractive, holographic, or metallic structure or array of structures. Also, an incoupler 11 is defined as a structure, i.e. an incoupling structure, which allows light to be directed into the waveguide 10 so that it propagates as a guided light beam 100. In specific cases the incoupling surface may be arranged to act as an incoupler 11. In other cases (FIGS. 1 and 2) an incoupler 11 may face an incoupling surface 12.

Further, the term "outcoupling surface 14" has to be understood as an outcoupling area through which light leaves the waveguide 10, i.e. at least a portion of guided light 100 is coupled to the medium outside the waveguide 10. The outcoupling area may be a virtual surface on which an outcoupler 13 is arranged such as, without any limitation: a refractive, a diffractive, a holographic, or metallic structure or array of structures. An outcoupler 13 is defined as a structure, which allows guided light 100 in the waveguide 10 to be directed out of it. In specific cases the outcoupling surface 14 may be arranged to act as an outcoupler 13. In other cases (FIGS. 1 and 2) an outcoupler 13 may face an outcoupling surface 14. As described further, incouplers 11 and outcouplers 13 may be areas on a side of a waveguide 10 or may be a portion of the surface of the waveguide 10 that has a coating or that has a wedge shape relative to a side surface of the waveguide 10. Incouplers 11 and outcouplers 13 are also defined respectively as incoupling and outcoupling structures or as incoupling and outcoupling layers, because they may be micro or nano-structured portions of the waveguide or dedicated incoupling and outcoupling layers. Incouplers 11 and outcouplers 13 may be static structures or layers but may also be dynamic layers in the sense that they may have light direction properties that may be changed by the action of forces such as electric forces, for example in the case of electrostatic driven microshutters or micromirrors.

The term "detection system" includes means to convert optical information provided by the indicium 4 of a smoking article 1 into an electrical signal or data that may be used to identify the smoking article 1 and/or information on the parameters of the aerosol generating device 2 that should be used for said article 1. Optical information on the aerosol generating article 1 may be provided by an indicium 4 arranged on a smoking article 1 but may also be provided by at least a portion of the smoking article such as provided by the surface structure of said portion or any information imbedded in or on said aerosol generating article. The information may be imbedded in or onto said aerosol generating article 1 by any physical or chemical means, as far as it may provide an optical effect which may be a spectral and/or colour effect and/or an intensity effect. Said waveguide allows transmitting, in operation of said device, said optical effect to said detection subsystem.

Waveguides 10

Waveguides 10 as described herein are configured to guide electromagnetic radiations, typically radiations having wavelengths including the UV, Visible and the whole infrared (IR) range.

Waveguides 10 may be of the following types, but not exclusively:

single mode or multimode waveguides 10;

a bundle of waveguides 10;

waveguides 10 having a non-circular shaped cross section, defined orthogonal to the longitudinal axis of the waveguide 10;

waveguides 10 having a rectangular cross section. Flat waveguides have preferably thin walls 10''' having a height t1 and have two faces 10', 10'' having a width t2 that is preferably larger than said height t1.

waveguides 10 may be made of non-flexible or flexible materials, or a combination of such materials;

waveguides 10 arranged to guide at least one illumination light beam and at least one guided light beam 100 provided by an indicum 4;

waveguides 10 of the invention may be Y-shaped waveguides and may comprise optical couplers 11, 13 and may comprise more than 2 waveguide branches either to collect light from an indicium 4 or to provide light to an indicium 4;

a waveguide 10 may be hybrid and comprise different types of waveguides, for example a flat waveguide on top of which a multimode fiber is arranged;

waveguides may be hollow waveguides, explained in detail hereafter

Flat waveguides, also defined as planar waveguides are particularly well suited to form 1Dimensional images of an indicium, because of the total internal reflection between the parallel planes of the flat waveguide. For example, a flat waveguide may be used to provide a 1D image of a series of parallel code lines that are arranged on a circumference of an article. The optical system that uses a flat waveguide arranged so that its length is orthogonal to the code lines may provide an image that consists of different elongated dots along a virtual line.

It is possible to provide 2D images by using waveguides that have rectangular and square cross sections. In order to achieve this one must rely on so-called self-imaging effect. An image is in fact not "transmitted" through a waveguide, it is only its phase distribution that has a periodic repetition along the length of the waveguide, be it a flat waveguide or any multimode fibre. By using a predetermined length of a flat waveguide, one may choose its width and wavelength in order to satisfy the conditions of self-focusing. The following publication explains the effect of self-imaging in waveguides:

O. Bryngdale; Journal of Optical Society of America, vol. 63, nr. 4, 1973

In embodiments, at least two waveguides may be arranged on top of each other, and at least one waveguide of such a hybrid arrangement may be configured to guide an illumination light beam for illuminating at least partially the indicium. This provides a configuration, wherein the illumination light source and the detector is located away from said indicium, for example in an area of a device where the temperature is lower, in operation, than 100° C., possibly lower than 50° C. The types and dimensions and materials of the waveguide 10 will be chosen according to the type of indicium 4 and the geometrical and working temperature requirements of the aerosol-generating device wherein it is implemented and are typical, but not exclusively the following choices:

single fibres 10: for transmitting intensity, polarisation and spectral information;

fibre bundles 10: for transmitting images and illuminating light beams;

flat waveguides 10: for transmitting intensity, polarisation and spectral information, as well as the transmission of images and illumination light beams.

All the embodiments herein may be adapted to guide also an illumination beam that is provided by a light source arranged to the waveguide 10 to the side away from an indicium 4. This may be realized inside a waveguide 10 or by arranging an additional waveguide 13 that may be arranged onto a waveguide 11 or may be a separate illumination waveguide.

Optical fibres 10 and fiber bundles 10, such as used for example in endoscopes, are well known to the skilled person in the field of guided optics and are not describes further here. It is also known how to configure an optical fiber arrangement suited for illuminating an object and collecting reflected or transmitted light by such an object. This is also described in prior art and is not further commented. In principle it is also possible to transmit partial images by a single optical fiber, as the information is contained in the Fourier transfer function. This is a more complicated solution than using flat waveguides as it requires more complex optical readers configured to assure e.g. calibration and/or polarisation requirements, but it can be implemented also in an embodiment. Transferring at least partially images by single multimode fibres presents a great interest for different imaging applications wherein the available space is very restricted and has been described recently in the literature, for example:

A. Fertman, D. Yerlin: "Image transmission through an optical fiber using real-time modal phase restoration"; Journal of the Optical Society of America B, vol. 39, pp. 149-157 (2013);

P. Caramazza et al. "Transmission of natural scene images through a multimode fiber", Nature communications, School of Physics and Astronomy, University of Glasgow, (2019) 10:2029; https://dol.org/10.1038/s41467-019-10057-8/www.nature.com/naturecommunications;

V. S. Feschenko et al, "Optical imaging system with a waveguide, Physical and Quantum Optics, Optics and spectroscopy, vol. 97, nr. 3, 2004, pp. 468-471.

Flat optical waveguides 10 in an aerosol generating device 2 have geometrical and functional advantages over simple optical fibres or fibre bundles as will become apparent from the following description of various embodiments of the invention.

FIG. 1 shows a schematic cross section of a portion of flat waveguide 10 comprising a diffractive incoupling structure 12 and a diffractive outcoupling structure 14. Both of the incoupling and outcoupling structures 12, 14 may be structured reflection gratings SRG1, SRG2. In embodiments more than one incoupling or outcoupling structure 12, 14 may be arranged at the waveguide 10 and one of the incoupling or outcoupling structure 12 may be a transmission grating. In all the embodiments of the invention, incoupling and/or outcoupling structures may be arranged to any side or edge of a waveguide 10.

Figure 2:
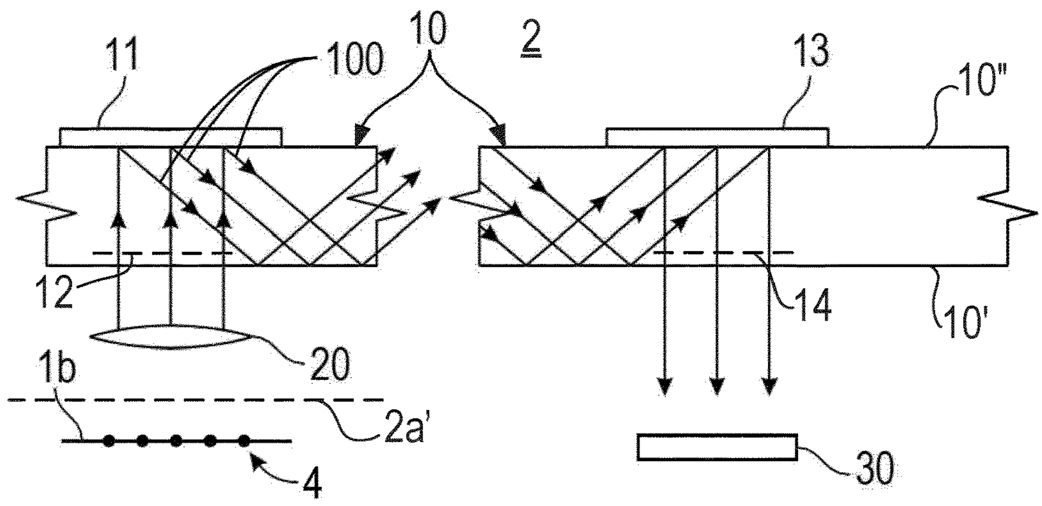
FIG. 2 shows a schematic cross section of a waveguide comprising a holographic incoupling structure and a holographic outcoupling structure.

FIG. 2 shows a schematic cross section of a portion of a flat waveguide 10 comprising a holographic incoupling structure 12 and a holographic outcoupling structure 14.

Figure 3:
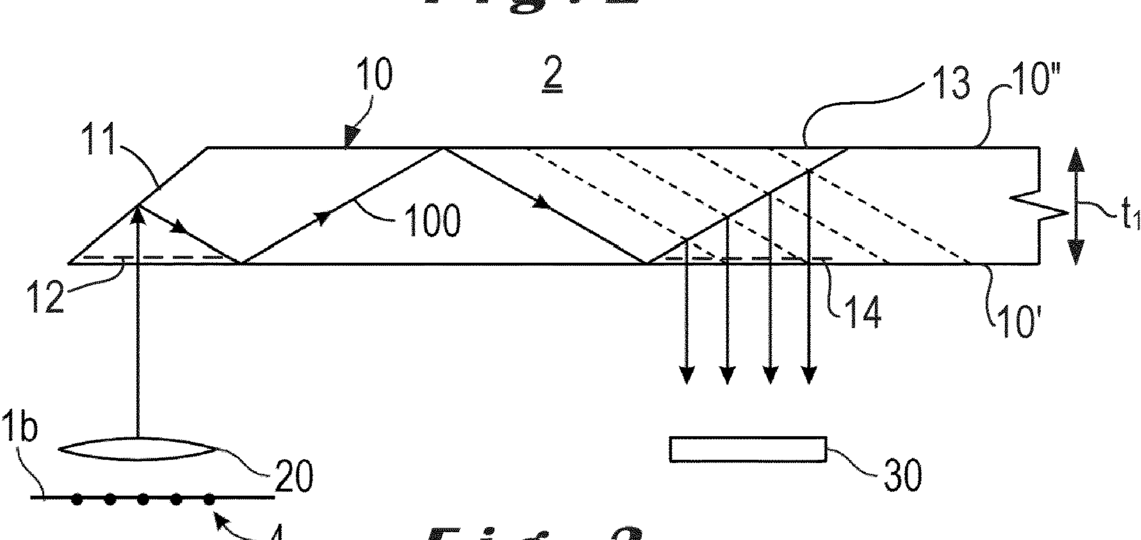
FIG. 3 shows a schematic cross section of a waveguide comprising a wedged shaped incoupling surface.

FIG. 3 shows a schematic cross section of a portion of a flat waveguide comprising a wedge-shaped incoupling surface 12. In the embodiment of FIG. 3 internal at least partial deflection structures may be provided, as illustrated.

There are no limits to the choice of materials used for the waveguides 10 of the invention. The materials may be made preferably of a material chosen from a dielectric group comprising common or special glasses or $TiO_2$, or $HfO_2$, or $Ta_2O_5$, or $ZrO_2$, or AlN, or $Al_2O_3$, or ZnO, or $SiO_2$, or $Si_3N_4$, or $CaF_2$ or MgO, or combinations thereof. Said material may also be chosen from a substantially transparent polymer comprising Polyethylene terephthalate (PET), Polycarbonate (PC), Polyethylene napthalate (PEN), Polymethyl methacrylate (PMMA), polyesters, polyethylene (PE), polypropylene (PP), Polyethylene furanoate, Polymethyl methacrylate (PMMA), polymers based on poly (bis-cyclopentadiene) condensates, colorless polyimide (CP), cellulose, PEEK polymers, and their combination. The polymers or composite materials based on a polymer matrix have the advantage of being elastic and thus providing flexibility for thin waveguides 10. The polymer or dielectrics can also include additives such as chemicals or nanoparticles. Semiconductors such as Si and Ge or a combination of them may also be chosen as materials for the waveguide 1, especially is infrared light is used for illumination and imaging. The wide range of possible materials allows to design a huge variety of waveguides 10 of different lengths that may be suitable for guiding light in the UV, visible and infrared parts of the electromagnetic spectrum. Waveguides 10 of the invention may be at least partially doped waveguides 10 and may be configured as gradient and/or step refractive index waveguides 10. Waveguides 10 may comprise a cladding layer and may comprise a protection layer.

Advantageously, waveguides 10 are made of heat resistant materials defined as a material that may withstand, without modification of its optical properties, temperatures of up to 400° C. In variants, waveguides 10 may be stand-alone waveguides 10 or may be waveguides 10 that are realized on a substrate that has not necessarily an optical function.

In a preferred embodiment, described in detail further, the waveguide is made of polysiloxane, which have stable optical properties up to 290° C.

Other good candidates for the material of the waveguides 10 in the present invention are polyimides and polyamide-imides. These materials comprising imide groups withstand temperatures above 300° C. and have sufficient optical transmission such as typical losses of not more than 0.2 dB/cm, which is largely sufficient for the lengths of the waveguides 20 that are typically cm sized, for example 1 to 5 cm or 5 to 10 cm.

Aromatic polyamide-imide polymers (PAI) are thermoplastics that are particularly interesting for realizing waveguides 10 according to the invention. The reason is that they are optically transparent, offering high thermal stability even above 300° C., the have excellent chemical resistance and have robust mechanical properties so that they may be easily twisted and/or adapted near a heater 3 or any hot place in the device 2. Furthermore, they have losses as low as 0.2-0.3 db/cm at 830 nm wavelengths, meaning practically no intensity losses after a propagation length of 20-50 mm. It is possible to realize waveguides that have lateral surfaces that have a roughness of the order of 1/10th of a wavelength in the visible range of the spectrum.

Although flexible waveguides 10 provide great benefits in limited spaces, the waveguides may also be made of a hard-transparent material that may be mechanically formed or etched or may be molded, such as sol-gels or any castable transparent material in the chosen spectral band of transmission through the waveguide. Because the waveguides 10 in the present applications have low lengths L, typically smaller than 20 cm, or smaller than 10 cm or even smaller than 50 mm, the transmission properties are not so very important and intensity losses of a factor 2 or 3 for example may still be easily exploited.

In an advantageous embodiment the waveguides are rigid or flexible hollow waveguides. Although hollow core fibres are usually known for their higher absorption losses over solid fibres, which are detrimental for typical telecommunication usages, they are well suited as waveguides in the invention, wherein the total length of the waveguides is typically less than 10 mm because they have to fit into an aerosol-generating device in which the available space is very limited. Indeed, over such a short length of a hollow waveguide, intensity losses of more than 30% and up to 50% do not negatively affect the performance of the waveguides in its purpose to transmit light reflected or refracted from an indicium on an aerosol-generating device to a detector. Hollow core fibres exhibiting intensity losses of less than 10% over 100 m allow to guide light over distances smaller than typically 1 m with less than 10% losses independent of the wavelength of the guided light. Wide spectral distribution light such as UV, visible and infrared light at the same time may thus be guided in hollow core waveguides thanks to the inner index of refraction of the waveguide being substantially equal to 1 if the hollow core is vacuum, or a gas such as air.

In the context of the invention, hollow core waveguides may be hollow core fibres having a cylindrical or non-cylindrical core with a smallest dimension of a core transversal cross-section of at least 500 μm, preferably at least 50 μm, still preferably at least 5 μm.

It is understood that hollow core waveguides must not be based on entirely hollow cores but may comprise advantageous structures inside the hollow core on to the wall of the cladding. During the manufacturing of hollow core waveguides structures may be integrated to improve the optical transmission.

In embodiments capillaries may be used to protect a waveguide, for example for heat protection. In such case a waveguide 10 is arranged in the central aperture of a capillary tube. A capillary may comprise at least two waveguides.

In variants, cores and/or claddings of waveguides may be composed of at least two layers. The mechanical and optical properties of the waveguide may be non-uniform along the length of a waveguide.

In embodiments, a waveguide 10 may be formed directly on a surface of the heater 3 in as far that is made of a material that does not change its mechanical or optical properties up to 200° C. or up to 250° C. or up to 300° C. A layer of synthetic diamond for example may be realized on the outside or inside of a heater and be configured as a waveguide.

In embodiments at least two different waveguides may be arranged, such as for example a solid $SiO_2$ waveguide abutted to a polymer flat waveguide 10, the solid waveguide being arranged to a hot location in the device 2 and the polymer flat waveguide 10 being arranged to transmit optical information on the indicium, such as an image, to a detector located away from the hot location.

Incouplers 11 and Outcouplers 13

In advantageous embodiments, at least a portion of said waveguide 10 is arranged according to a resonant waveguide grating (RWG). Resonating waveguides are preferred choices as incouplers and outcouplers. RWG's are described in, for example:

A. Sharon et al.: "Resonating grating-waveguide structures for visible and near-infrared radiation": J. Opt. Soc. Am" vol. 14, nr. 11, pp. 2985-2993, 1997

Figure 20:
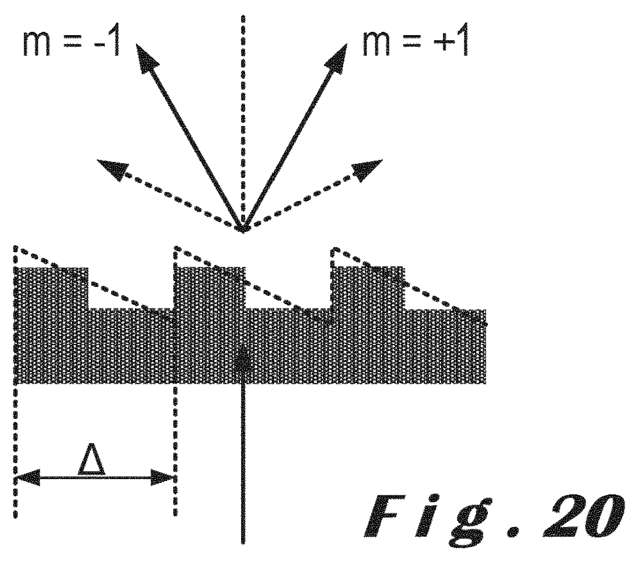
FIG. 20 shows a cross sections of a binary diffractive structure.
Figure 21:
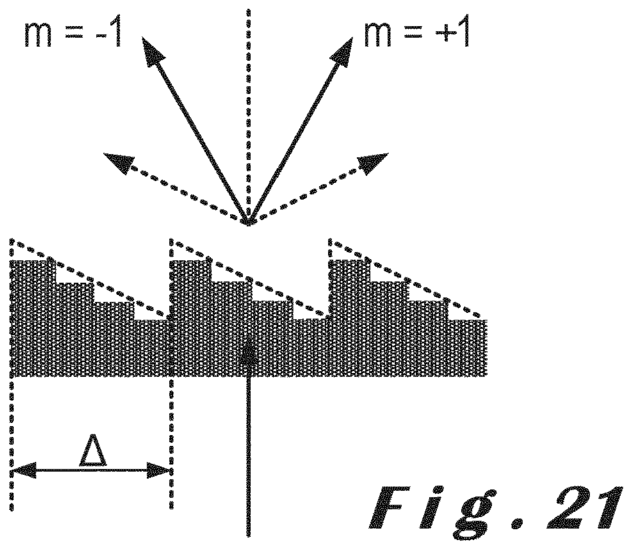
FIG. 21 shows a cross sections of a 4-level diffractive structure.
Figure 22:
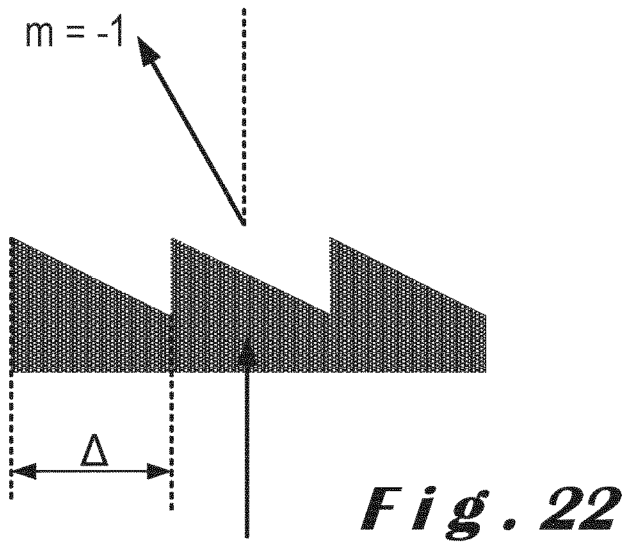
FIG. 22 shows a cross sections of a blazed diffractive structure.

RWG's are made by using a multilayer configuration and combine subwavelength gratings and a thin waveguide. A resonance occurs when incident light is diffracted by a grating and matches a mode of the waveguide. As most of the spectrum of incoupled light does not couple into the waveguide, strong spectral effects are provided in reflection and/or transmission. This to the fact that RWG's are corrugated waveguides and behave as a waveguide-grating. The use of RWG in indicia allows to provide unique optical effects that are extremely difficult to identify and to duplicate. RWG's are generally designed to have spatial periodicity shorter than the wavelength they operate with and are therefore called "subwavelength" structures or subwavelength devices. Eventually they have periodicities closed to the wavelength they are operating with and just above it. Quite often, the periods are significantly smaller than the free-space wavelength they are working with, for example a third of it. Because of their small periodicity, they do not allow various diffractive orders, which distinguishes them from much simpler diffractive optical elements (DOE) that are illustrated in FIGS. 20-22.

Using RWG allows to provide unique incoupling and outcoupling optical effects, for example by providing a high incoupling and/or outcoupling efficiency or to incouple and outcouple polarized light beams more efficiently or with predetermined angles which would not be possible by using ordinary diffraction gratings such as binary diffraction gratings. RWG may be realized by embossing techniques allowing to provide cheap waveguide that have very efficient light coupling efficiencies that may depend, according to their design, particularly on specific predetermined wavelengths. In variants that are not illustrated in figures at least one of the lateral surfaces of the waveguide 10 is arranged, continuously or discontinuously, over at least 50% of its entire length, as an incoupling surface 12 and/or an outcoupling surface 14. Said incoupling surface 12 and/or an outcoupling surface 14 may be constituted as a RWG.

Other preferred choices for the incouplers 11 and outcouplers 13 are, without limitation, the following:

- Binary gratings (FIG. 20);
- Slanted gratings;
- Multi-level diffractive structures (FIG. 21);
- Blazed grating structures (FIG. 22);
- Refractive and/or reflective microprisms:
- Holograms such as volume hologram layers, for example photopolymer holograms;
- Embedded micro arrays;
- Surface Relief gratings;
- Metasurfaces.

Binary, and multi-level diffractive structures are illustrated in FIGS. 20, 21, 22. Diffractive structures present a pitch Λ that is chosen in function of the used wavelengths. Binary structures allow to direct diffracted light in at least two diffraction orders. FIG. 20 illustrates a 2-level grating which allows to couple light into two directions in a waveguide. By using a multilevel approach, the diffraction efficiency is higher in one direction (for example in the order $m=-1$) and when 8-level gratings are formed the performance is the one of a blazed grating as illustrated in FIG. 22. Such grating structures may be formed by different processes such as hot embossing or photolithographic and replications methods. Diffractive structures may be designed to realize optical functions that would requires complex optical components. For example, a diffractive structure may be designed to couple a light beam into a waveguide and at the same time deviate and focus the light beam, which is particularly useful for coupling light efficiently into planar waveguides. Diffractive structures may be arranged along a waveguide to modify the shape and aperture of the guided light beam, or may be used to incouple, guide and outcouple only TE or TM polarized light which is particularly useful in the detection of difficult to replicate indicia which optical effects are based on the use of polarized light. In variants, a waveguide may comprise diffractive gratings on its surface to couple out a portion of the guided light beam 100, for example for intensity referencing purposes or possibly to illuminate and/or detect a second indicium.

Refractive and reflective microprisms are the easiest way to realize incouplers and outcouplers and may be realized with the same mold as the one used to make the waveguide 10, but they are no surface structures and present waveguides that have a protrusion or an edged surface for the in- and/or outcoupling The use of metasurfaces as incoupling and/or outcoupling structures 11, 13 has some specific advantages. Metasurfaces can be configured to provide true achromatic behavior in a very thin surface, by using only binary nanostructures. True achromatic incoupling and/or outcoupling allows to provide solutions wherein spectrally broadband light information is provided by an indicium 4. It is easier to fabricate binary nanostructures than complex analog surface relief diffractives and it is also easier to replicate them for example by using nanoimprint lithography or soft lithography. Metasurfaces can be generated by direct imprint on the waveguide substrate or a layer on the waveguide 10, in for example high refractive index inorganic layers or by resist lift-off processes.

Figures 4, 5:
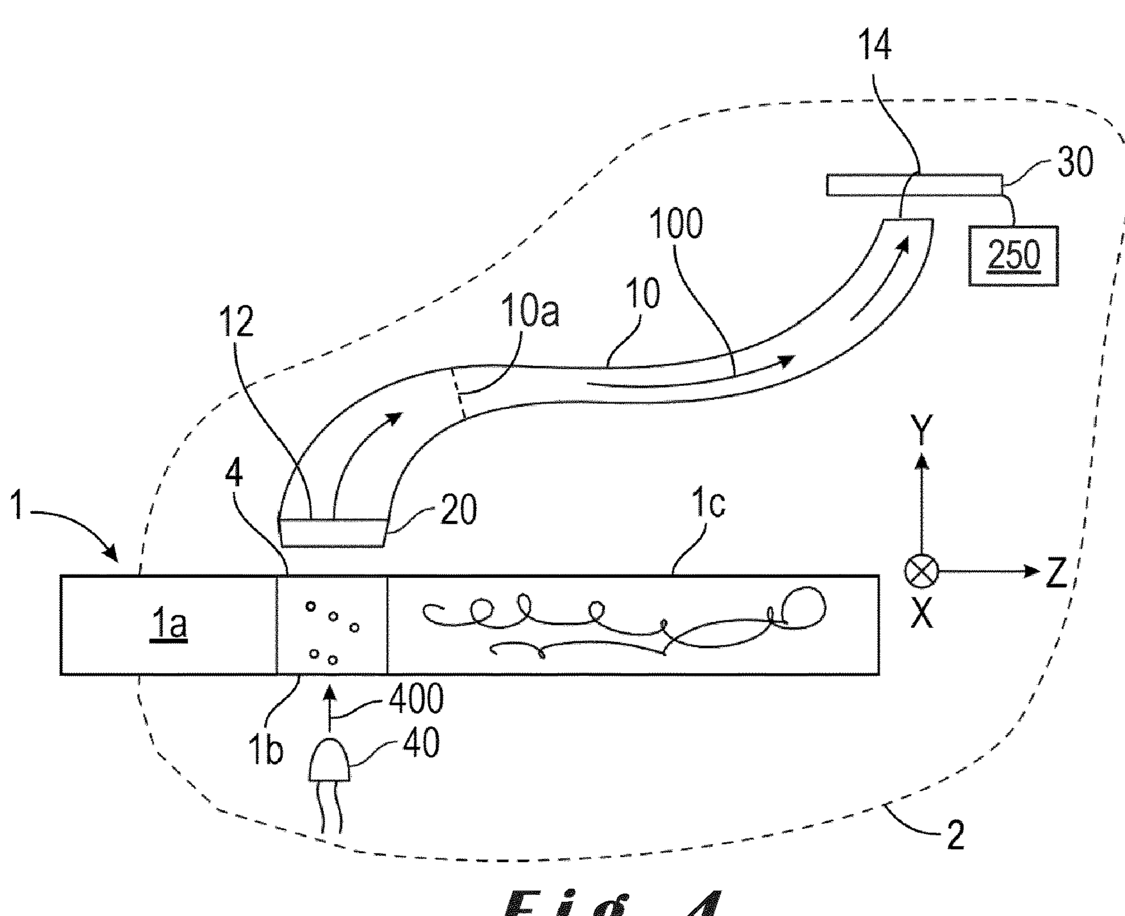
FIG. 4 shows a schematic representation of a manufactured aerosol-generating device according to an embodiment of the invention, and shows a consumable article inserted in said device.
FIG. 5 shows a schematic representation of an embodiment manufactured aerosol-generating device according to an embodiment of the invention, and shows a consumable article inserted in said device.
Figures 8, 9:
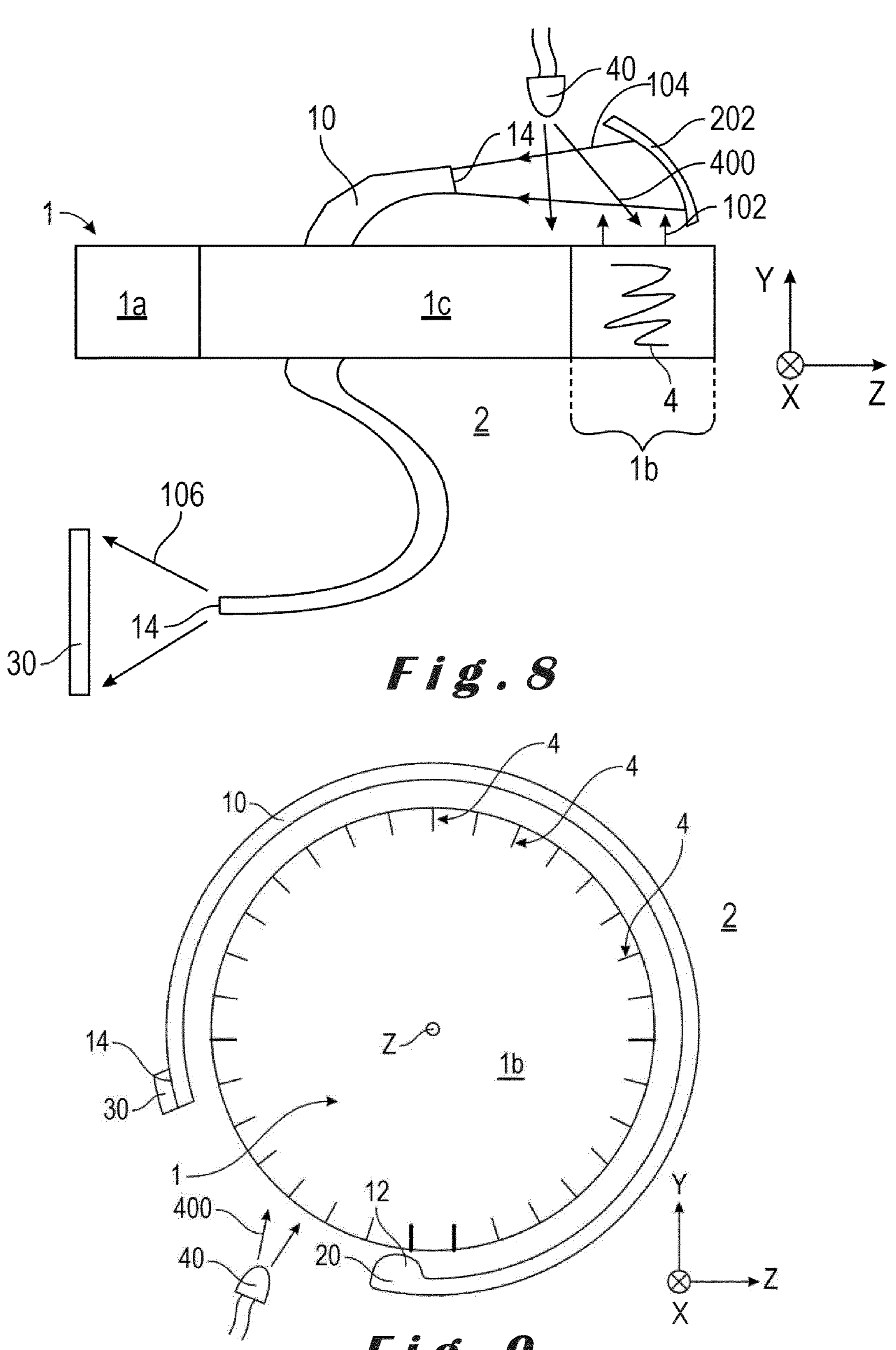
FIG. 8 shows a schematic representation of a manufactured aerosol-generating device according to an embodiment of the invention and shows a consumable article inserted in said device. The embodiment of the aerosol-generating device comprises a reflecting mirror arranged to direct light provided by a portion of a smoking article to an entry face of the waveguide.
FIG. 9 shows a schematic representation of a lateral cross section of a manufactured aerosol-generating device according to an embodiment of the invention and shows a consumable article inserted in said device. The embodiment comprises a waveguide that is arranged along at least a portion of the circumference of an article when inserted in the device.

FIG. 4 illustrates an embodiment wherein light provided by an indicium 4 is incoupled by an incoupling element 20, which may be any light focusing element such as a lens. The light focusing element 20 may be a curved mirror as illustrated in the embodiment of FIG. 8. Said lens or mirror may have a cylindrical shape. Incoupling 20 and outcoupling optical elements may comprise different or several optical elements. The illumination of the indicium 4 may be provided by different types of light sources 40, preferably by a broad band and cheap light source 40 such as a white LED. The light source 40 may also be a VCSEL or VCSEL array or any other type of semiconductor laser, for example a visible or infrared semiconductor laser. In embodiments the light source 40 may comprise different types of light sources or light sources that have different emission intensities and/or emitted beam shapes and/or emitted light beam directions. In variants, the light source used to illuminate an indicium 4 may be the infrared light that is emitted by the heater 3 when in operation.

In embodiments, in order to be able to detect low level light intensities a light source may be a pulsed light source. The optical reader system may comprise a feedback electronic system for example a synchronous detection system such as a lock-in amplifier that allows the detector to detect extremely low intensity signals, which can be used to reduce the power consumption of the device 2. The reflected and/or diffracted light beams 102 are incoupled and guided by the waveguide 10 and is at least partially detected by a detector 30. The detector 30 may be a single detector or a detector array or may be small camera. In embodiments the detector 30 is arranged to detect the spectral or color distribution of the light provided by the illuminated indicium 4 and convert the optical information in an electrical signal and data which contains information on the article. In variants of all the embodiments as described herein the detector 30 may be a detector system comprising processing electronic circuits and/or CPU to handle and convert the data so that the aerosol generating device may identify the smoking article and/or adapt parameters of use for the smoking article, for example parameters related to the needed temperature range or maximum temperature.

Waveguide 10 and Device 2 Arrangements

Figure 14:
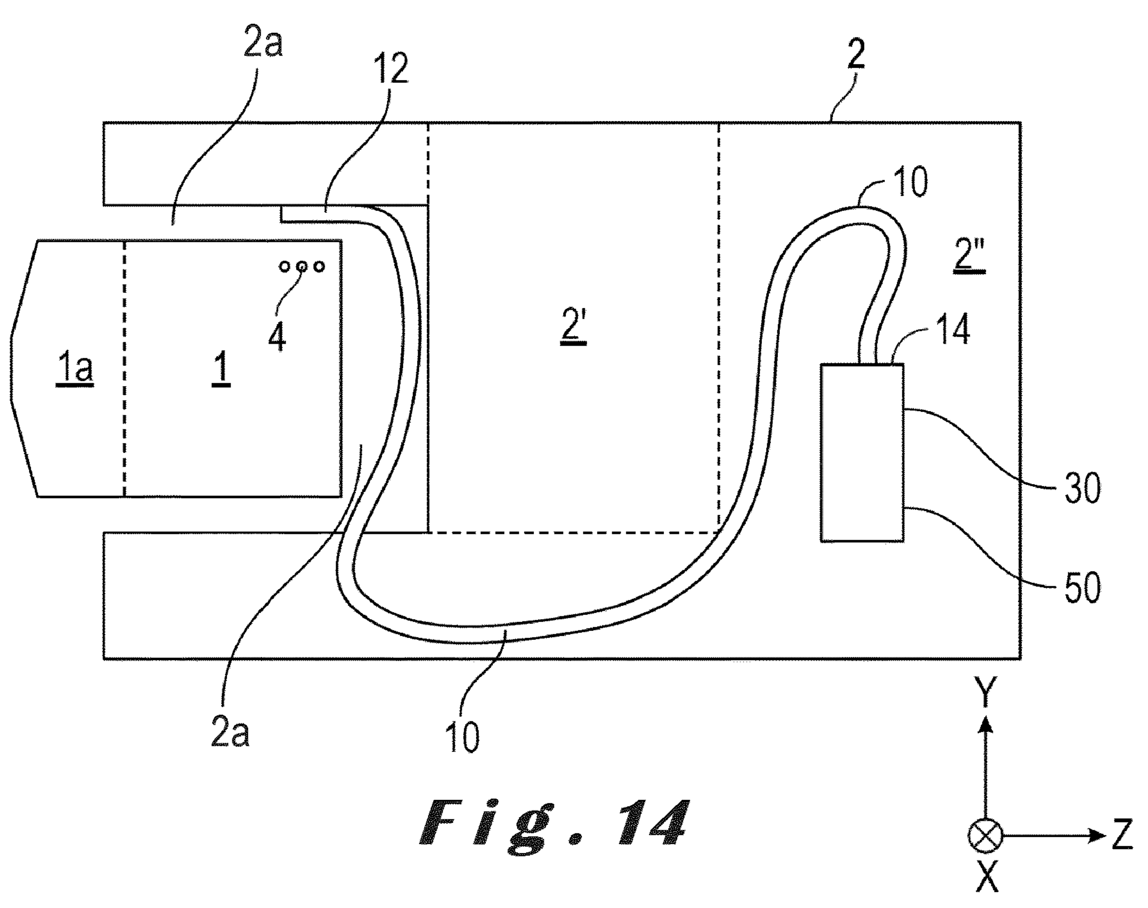
Figure 16:
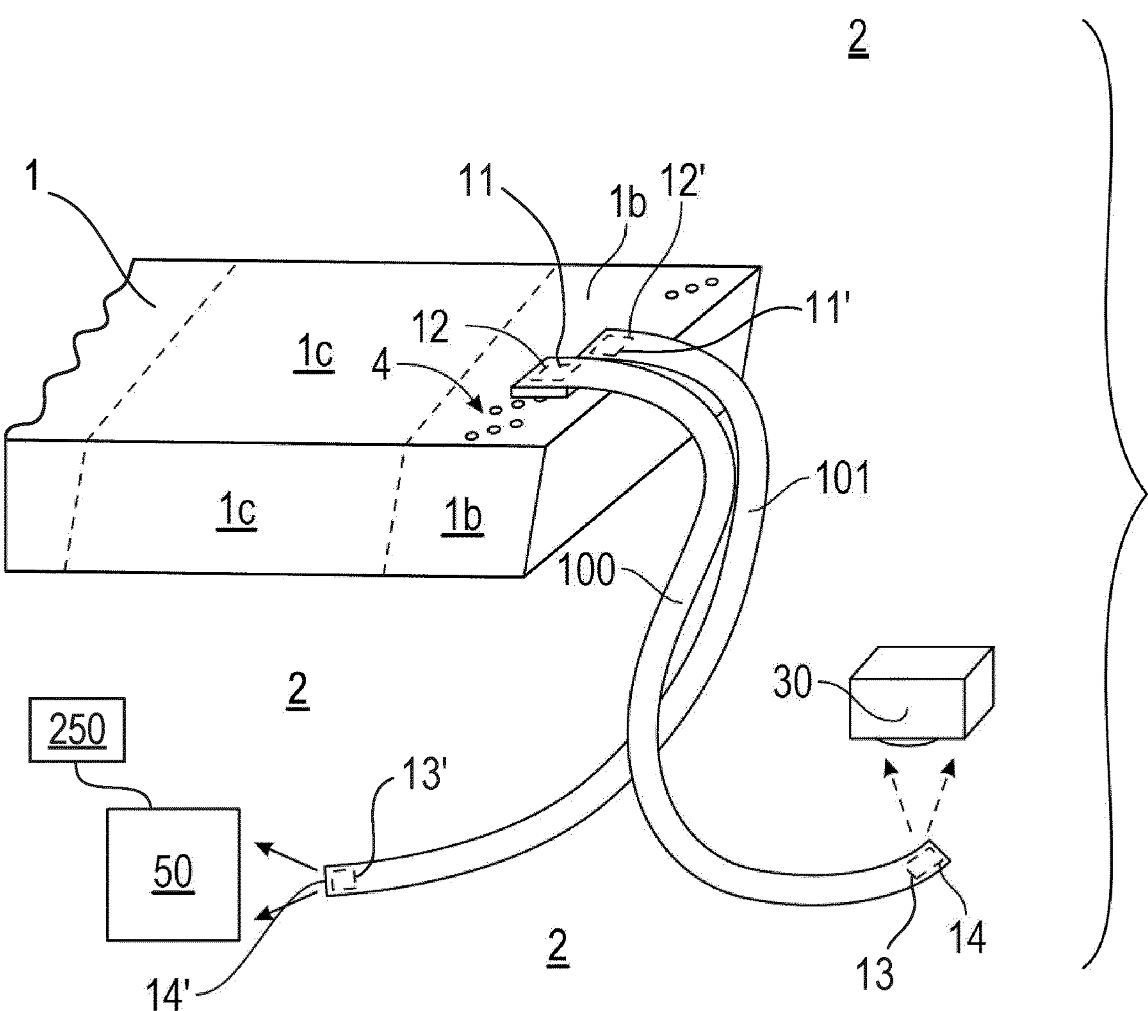
Figures 17, 18, 19:
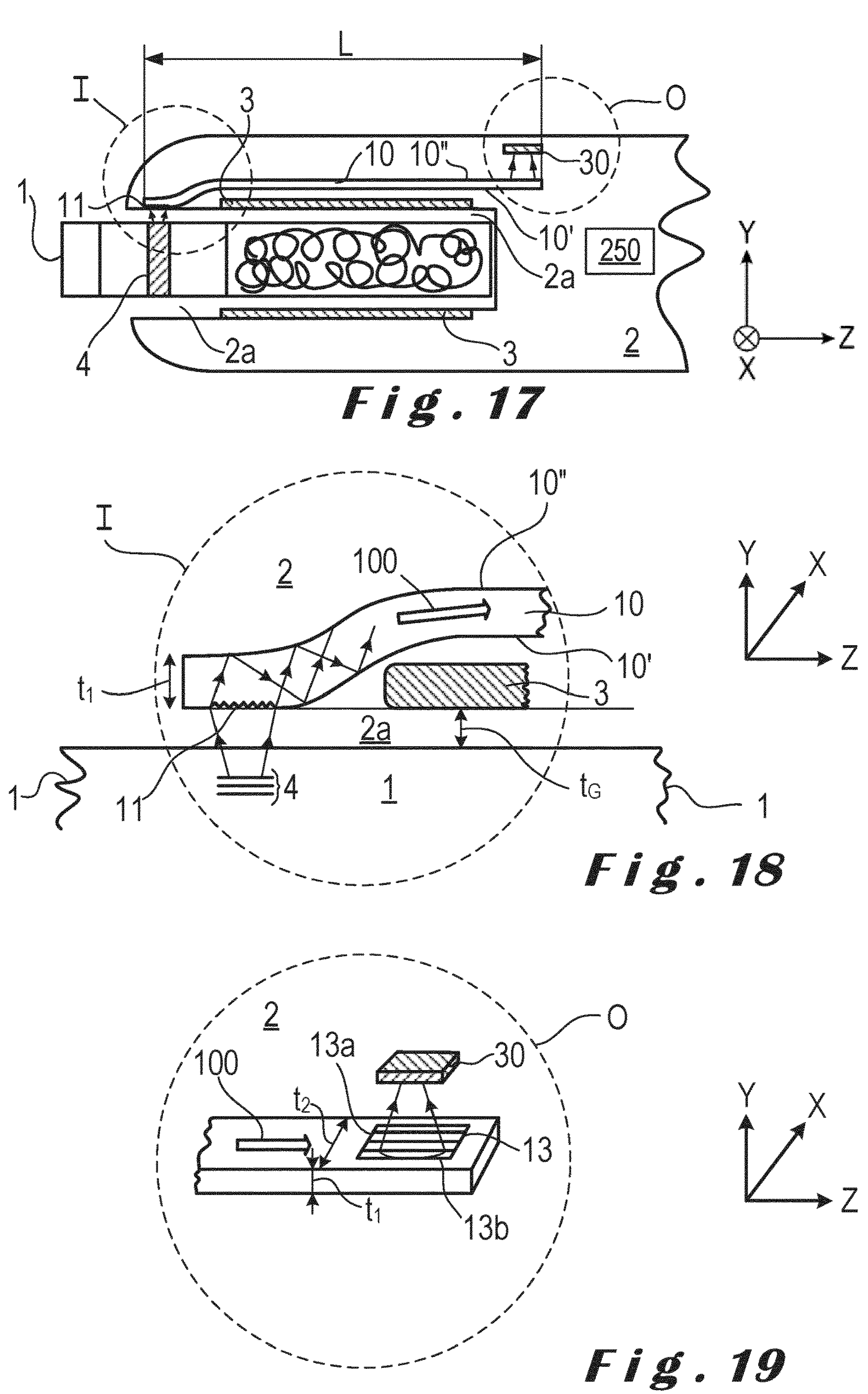
FIG. 17 illustrates an exemplary realization.
FIGS. 18 and 19 show enlarged sections of the device of FIG. 17.

For reasons of clarity of the Figures not all components are illustrated in all the Figures, for example only FIGS. 12,14, 16, 17 illustrates a control unit 250, and only FIGS. 14, 17,18 illustrate the cavity 2*a* of the device 2.

FIG. 4, and further FIGS. 5-16 describe alternative arrangements of waveguides in aerosol-generating devices compatible with the inventive system. An indicium 4 provided on an outer surface of an aerosol-generating article 1 such as a heat-not-burn stick 1 may be arranged near to a hot surface in the aerosol generating device 2. By using the waveguide system of the invention, the detector 30 may be so arranged far from the hot surface which avoids to heat the detector 30. In variants of all the embodiments of the invention, in which the incoupling surface 12 or incoupler 11 of the waveguide 10 is arranged near to a hot surface, the waveguide 10 shall be made of a heat resistant material. There are no particular limitations to the length or any dimension of the waveguides 10. The length L is defined as the waveguide dimension as measured along the propagation direction of the light in the waveguide from an incoupling surface to an outcoupling surface thereof. For example, a waveguide 10 may be a short waveguide having a distance, defined as a length L, of 5 mm to 30 mm from said incoupling surface 12 to said outcoupling surface 14. Said length L may be greater than 30 mm. A waveguide 10 is preferably longer than its width but may be as large as its width. Also, the width may be greater than the length L. A waveguide may have the shape of a square and have, arranged in one corner, an incoupling surface and in another corner an outcoupling surface. A waveguide 10 may have at least two incouplers and/or at least two outcouplers, which may be used in the arrangement of a waveguide 10 that is bent around a surface of a wrapper to detect indicia that are arranged on different places on a wrapper and that are situated at two different cross sections of an article. In embodiments a waveguide 10 may have the shape of a Y having an incoupling branch and at least two outcoupling branches. In variants, a waveguide 10 may have a cross-shape. In embodiments light may be incoupled and/or outcoupled from any surface portion of the waveguide 10, for example from a portion of a thin wall 10'''. This is mainly interesting in the case of the detection of intensity or polarization. In the case of transmittance of an image of the indicium 4 incouplers and outcouplers are preferably arranged in the plane of a waveguide 10, i.e. perpendicular to its thin walls 10'''.

FIG. 5 illustrates a configuration of a waveguide system in which the incoupling surface 12 faces an indicium 4 and is configured to collect light provided by an indicium 4 without using incoupling elements. FIG. 2 illustrates a waveguide system wherein a detector system comprising a detector 30 is positioned at another side of an article 1 than the side to which the incoupling surface 12 of the waveguide 10 is positioned.

Figures 6, 7:
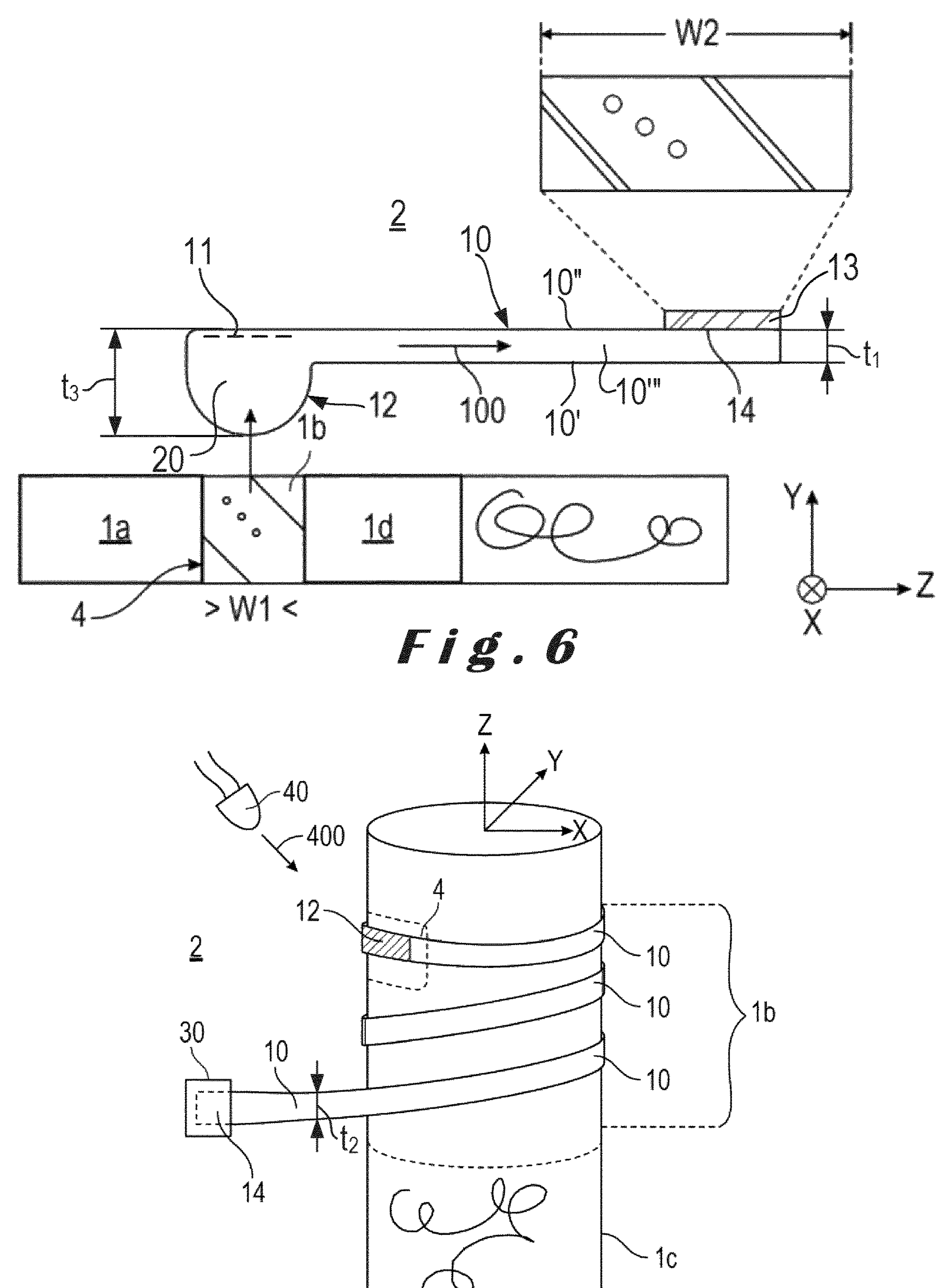
FIG. 6 shows a schematic representation of an embodiment manufactured aerosol-generating device according to an embodiment of the invention, and shows a consumable article inserted in said device. In this embodiment the waveguide comprises an optical focusing element that is part of the waveguide.
FIG. 7 shows a schematic representation of a manufactured aerosol-generating device according to an embodiment of the invention and shows a consumable article inserted in said device. In this embodiment the waveguide is configured in a helicoidally wound arrangement.

FIG. 6 illustrates the cross section of a flat optical waveguide 10 that comprises an integrated incoupling and imaging lens 20. Such lens 20 may be a refractive lens or may be a diffractive optical structure that is configured to have a focusing function. The waveguide 10 is configured to transmit an image of at least a portion of an indicium 4 to a detector 30. In the embodiment of FIG. 6 a magnifying waveguide system is illustrated in which said portion has a largest width W1 and is projected on the outcoupling surface 14 of the waveguide 10 as an image 120 having a largest width W2 that is a factor F greater than the width W1 of said portion. In variants said factor F may be at least 2, preferably greater than 5, even more preferably greater than 10. When an optical element 20 is integrated onto of into a waveguide 10 the local thickness t3 may be greater or smaller than the thickness t1 of the waveguide cross sections. In variants, an integrated optical element 20 as illustrated in FIG. 6 may be arranged into an aperture provided in a heater or may be arranged to a mechanical element that is part of a heater 3.

The waveguide 10 of the invention may have a typical largest thickness t1 between 0.3 mm and 0.5 mm, more preferably between 0.5 mm and 2 mm. waveguides of the invention may be non-uniform waveguides and may be for example tapered waveguides 10. In some embodiments the waveguide 10 may be thicker than 2 mm. Said integrated focusing element may have a typical thickness t2 between 0.05 mm and 1 mm. The waveguide 10 may comprise at its output surface 14 an integrated focusing projection focusing element, not illustrated in figures. An integrated focusing projection focusing element may have a similar shape and geometry as said integrated focusing element 20.

In embodiments, the waveguide 10 (optical fiber or flat waveguide) may have a core layer and a cladding layer, the core layer having a higher refractive index that the one of the cladding layer. In variants, a dielectric or metallic layer may be arranged to at least one side of the waveguide 20.

FIG. 7 shows a schematic representation of a manufactured aerosol-generating device according to an embodiment of the invention and shows a consumable article inserted in said device. In this embodiment the waveguide is configured in a helicoidal arrangement. In variants of the embodiment of FIG. 7 said waveguide 10 may have a plurality of incoupling surfaces and/or may have a plurality of outcoupling surfaces. Providing a plurality of incoupling and outcoupling surfaces allows to realize arrangements of waveguide systems that may collect light provided by a plurality of indicia arranged on a smoking article. For example, in a variant of the embodiment of FIG. 7, not shown in figures, the waveguide 10 may comprise an array of indicia 4 and so that each incoupling surface 12 faces at least a portion of an indicium 4 of said array. This allows to detect indicium 4 independently of the axial orientation of an aerosol-generating article bearing such indicium after insertion thereof in the cavity 2*a*.

FIG. 8 illustrates an embodiment in which the indicium 4 is arranged to an extremity of the smoking article 1 and illuminated by a light beam 400 provided by a LED 4. The wide angular light beam 400 illuminates, in operation, the indicium 4 that is arranged on a complete circumference of the article 4. This allows to provide a solution that is insensitive to the axial orientation of the smoking article 1 relative a fixed waveguide system of the device 2. FIG. 8 illustrates an embodiment wherein reflected light provided by the indicium 4 is directed to a concave mirror 202, allowing to deflect and focus the light onto the incoupling surface 12 of the waveguide 10. Incoupled light is guided by the waveguide and directed to a detector 30 or detector system arranged to another side of the device 2. The curvature of the waveguide 10 as illustrated in FIG. 8 and in all the embodiments herein are merely exemplary configurations.

FIG. 9 shows an embodiment wherein an indicium is arranged on a complete circumference of a smoking article 10 and wherein a waveguide 10 is arranged so that the incoupling surface 12 always faces at least a portion of the indicium 4. This provides a solution so that the detected optical signal is independent of the axial orientation of the article 1.

Figure 10:
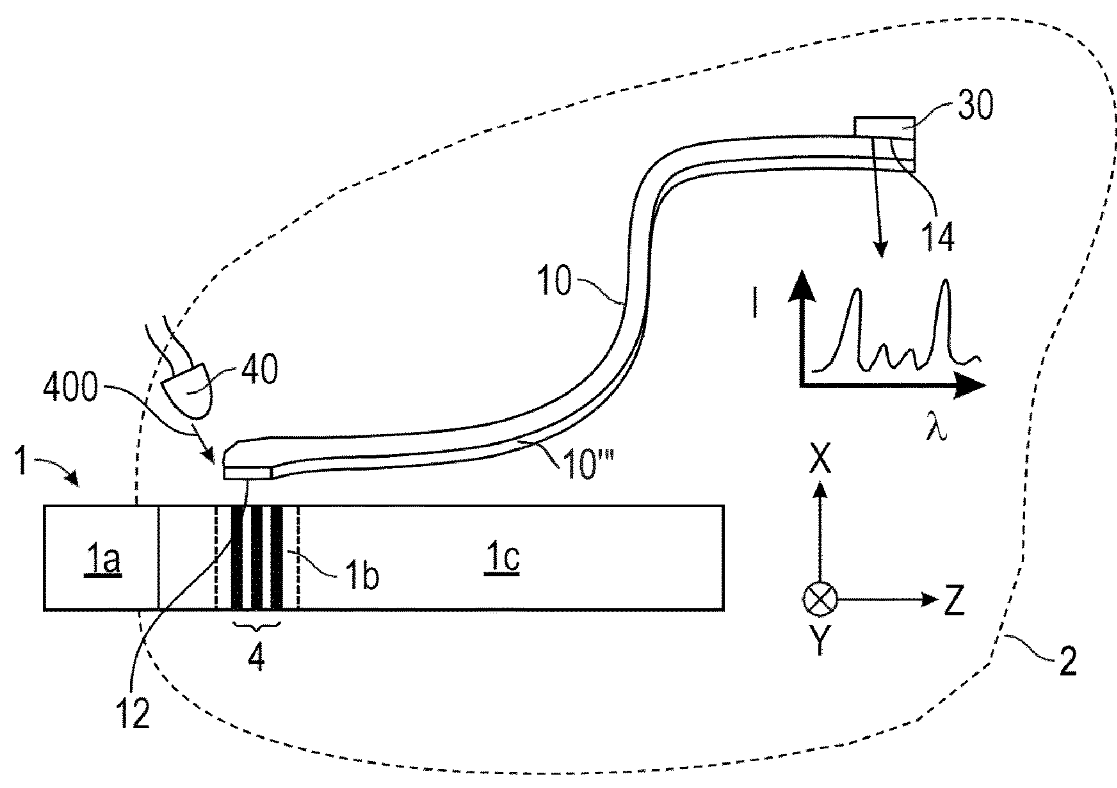
FIG. 10 shows a schematic representation of a manufactured aerosol-generating device according to an embodiment of the invention and shows a consumable article inserted in said device. The embodiment comprises a waveguide comprising a lateral incoupling surface facing an indicium of an article.

FIG. 10 shows another embodiment wherein an indicium 4 is arranged on a complete circumference of a smoking article 10 and wherein a waveguide 10 is arranged so that the incoupling surface 12 always faces at least a portion of the indicium 4. This provides a solution so that the detected optical signal is independent of the axial orientation of the article 1. FIG. 10 shows an example of a waveguide 10, that is preferably a flat waveguide, that transmits spectral information of the indicium to a detector 30. In variants a flat cable comprising a plurality of multimode fibers may be used.

Figure 11:
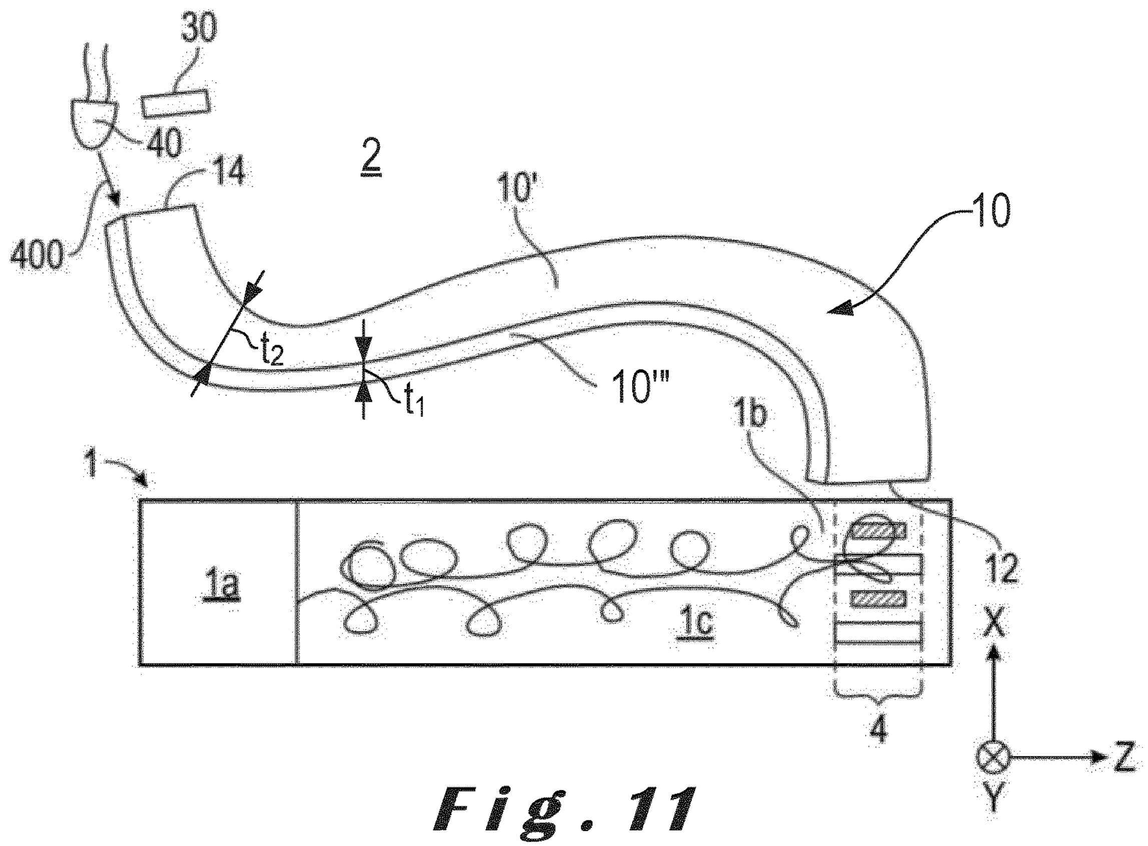
FIG. 11 shows a schematic representation of a manufactured aerosol-generating device according to an embodiment of the invention and shows a consumable article inserted in said device. The embodiment comprises a waveguide comprising an edge incoupling surface facing an indicium of an article.

FIG. 11 illustrates an embodiment in which an illuminating portion 13' of the waveguide 10 is configured to guide light 400 provided by a light source. Another portion 11 is fit to collect and guide light 100 provided by an indicium 4. In advantageous variants said illuminating portion 10' may be another waveguide, such as a multimode fiber, that is arranged to a flat optical waveguide 10'

Figures 12, 13:
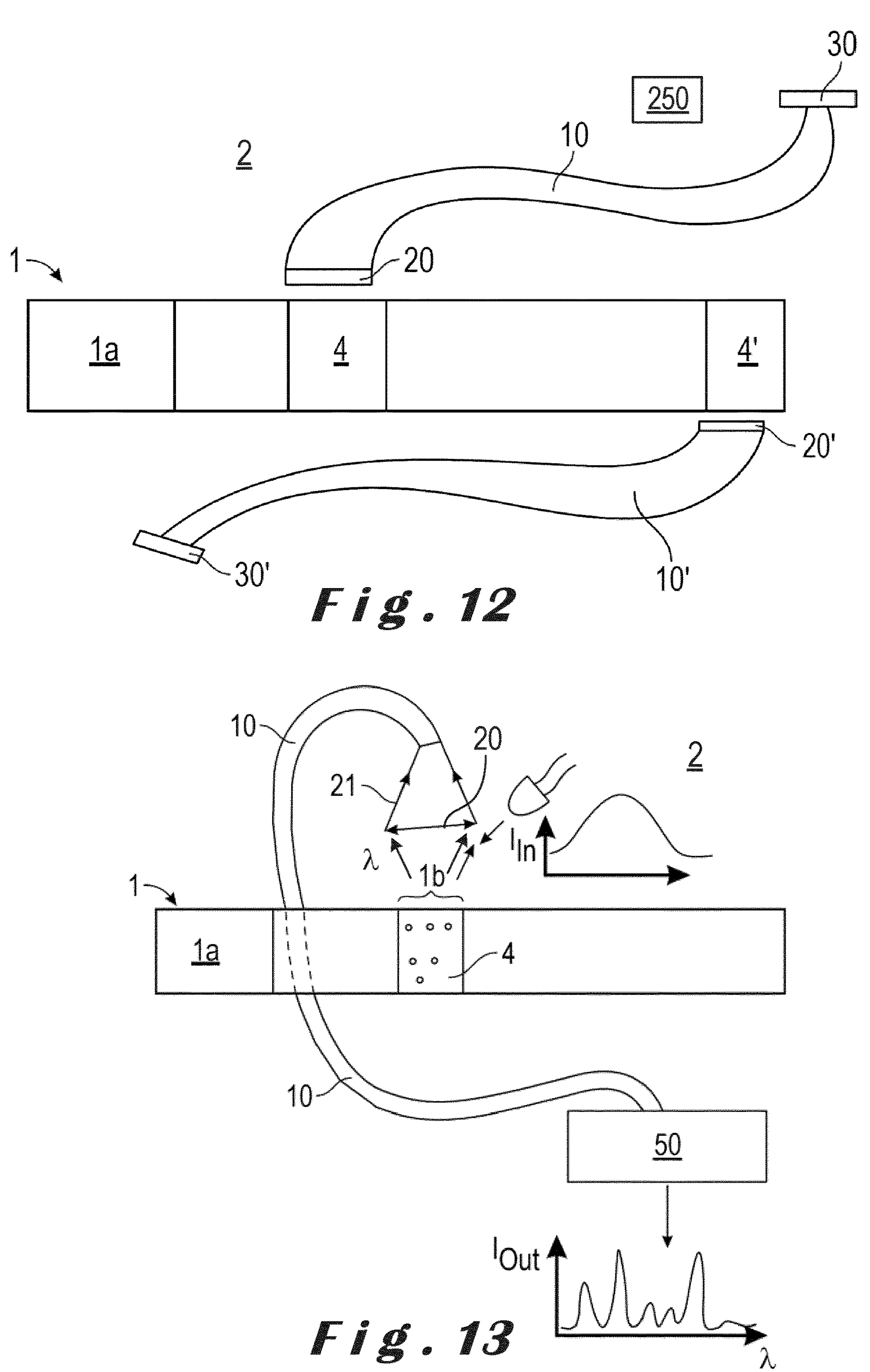
FIG. 12 illustrates an aerosol-generating device according to an embodiment of the invention.
FIG. 13-16 illustrate embodiments of an aerosol-generating device according to another embodiment of the invention.

FIG. 12 illustrates a variant in which at least 2 waveguides 10, 10' are arranged in an aerosol generating device 2. Each of said waveguides 10, 10' may be arranged to different indicia 4, 4' and optical information may be provided to at least two separate detectors 30,30' or detector systems. Said at least two separate detectors 30, 30' or detector systems may be different and at least one of them may comprise optical filters and/or a miniaturized spectrometer and/or a small camera.

FIG. 13 illustrates an embodiment in which an indicium 4 comprises a layer which reflectance color or spectrum is modified by at least one absorbing or diffraction layer. A broadband light source 40, such as a white LED, directs a light beam 400 having a broad spectrum onto said indicium 4. The waveguide 10 is arranged to transmit the reflectance spectrum of the indicium 4 to a spectrometer 50 that is arranged away from said indicium 4.

Figure 15:
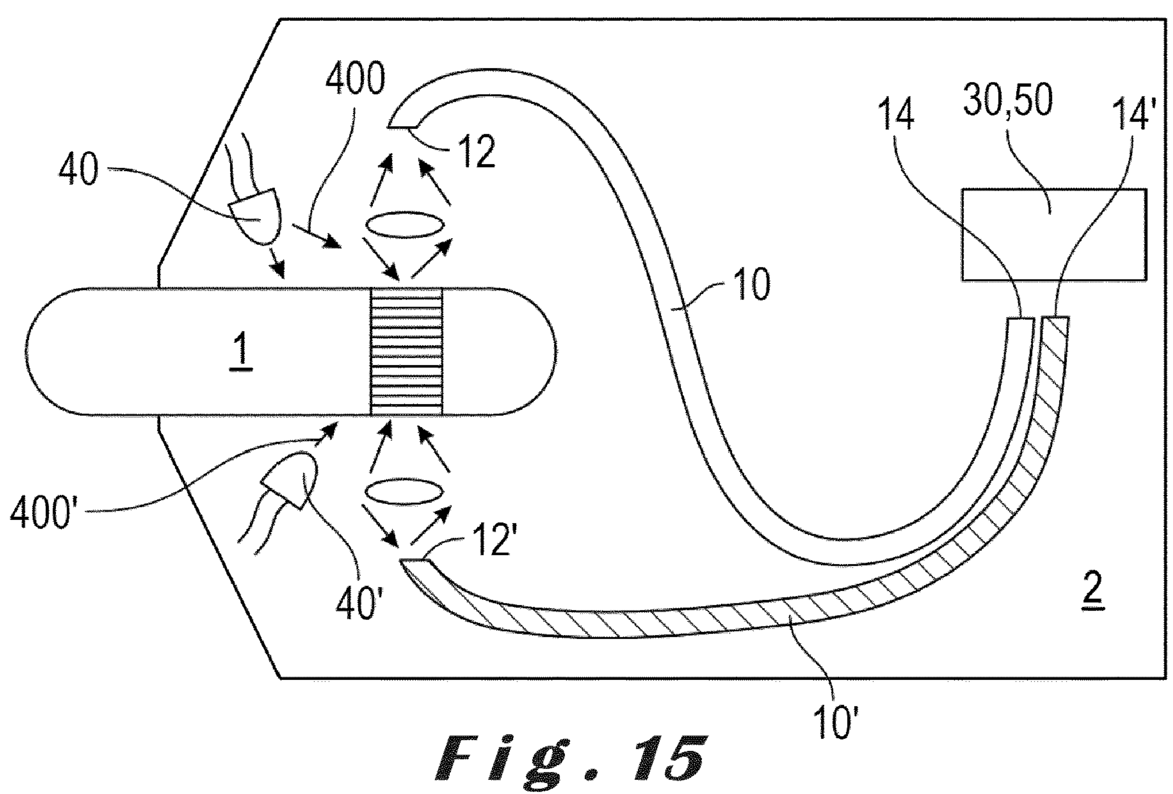

It is understood that the waveguides 10 of the invention may be arranged in a wide variety of forms and geometries or may be arranged in any configuration in an aerosol generating device 2. FIG. 14 illustrates a typical configuration wherein at least one waveguide 10 is arranged so that a detector 30 or a spectrometer 50 may be arranged into an area 2" that is separated from said cavity 112 by a wall 2' or any other structure of the aerosol generating device 2. FIG. 15 shows an exemplary configuration that comprises at least two separate waveguides 10, 10'

FIGS. 15 and 16 illustrate other embodiments that illustrate the use of waveguides 10 in an aerosol generating device.

The invention relates also to a method for authenticating a consumable article 1 and comprises the steps of:

- providing an aerosol generating device 2 as described and a consumable article 1, as described, comprising an indicium arranged on an outer surface,
- inserting at least a portion of the consumable article 1 comprising the indicium 4 in the cavity 112 of the aerosol generating device 2,
- illuminating the indicium 4 on the outer surface of the consumable article 1 and collecting reflected light from the indicium 4 through the waveguide 10 and guiding said reflected light to the detector 30, 50 of the optical reader system,
- authenticating the consumable article 1 by computing information contained in the reflected light impinging on the detector 30 in the control unit.

In an embodiment the detector 30 is a detector system and may be or comprise a spectrometer 50.

In an embodiment the method further comprises a step of commanding the heater with the control unit based on the information computed in the authentication step.

EXEMPLARY REALISATIONS (EXAMPLES 1, 2)

Example 1: Self-Standing Waveguide 10

FIGS. 17-19 illustrate an exemplary realization of a device 2 comprising a heater 3 for heating an article 1. A self-standing waveguide 10 is arranged to the backside of a tubular heater 3 that may reach temperatures of at least 250° C., and up between about 300° to 350° C. A self-standing waveguide is defined as a waveguide that may be handled and arranged in a device, for example by gluing or welding or mechanical clipping of at least one portion of the waveguide, to the contrary of deposited waveguides as described in a second example of realization hereafter.

Said tubular heater 3 may be formed of an electrical and/or thermal conducting tube, such as a metallic tube, defining an inner tubular cavity for receiving an aerosol-generating article 1. The tube may be electrically connected to a power source and control unit of the aerosol-generating device 2 to resistively heat the consumable article 1 when inserted. Alternatively, the tubular heater 3 may be contacted with resistive electrical means, such as resistive wires or tracks arranged on a flexible support material wrapped around the tube and connected to the power source of the device 2. To avoid convective heating to the outside of the device 2, an insulating assembly, not represented in the figures for sake of clarity, may be provided about the heater 3 in the housing to keep outside temperature of the housing compatible with manual holding of the device (typically between 30°-50° *C. maximum*).

The waveguide 10 comprises an incoupler 11 and an outcoupler 13. The incoupler 11 is configured to incouple light provided by the indicium 4 and provides a guided light beam 100 that propagates to an end at which an outcoupler outcouples at least a portion of the guided light beam 100. The incoupler 11 and the outcoupler 13 in the exemplary realization is a diffractive grating. The outcoupled light is directed to a detector 30 that may be an imaging CMOS imager. The outcoupler may have a round or rectangular shape, having for example an outcoupler width 13*a* and an outcoupler length 13*b* that is chosen in function of the size of the guided light beam section at the level of the outcoupler 13. The outcoupler 13 and/or the incoupler 11 may be configured to focus in one plane, similar to a cylindrical lens, or in two orthogonal planes similar to a symmetrical lens. In variants, an outcoupler 13 may be configured to direct light into two different directions and to at least two separate detectors.

In a device 2 such of the type of the exemplary realization of FIG. 17, very limited space is available for arranging an optical system such as an optical magnification system in the housing, with an optical access to the aerosol-generating article 1 when inserted in the cavity 2*a* to read an indicium 4 printed on an outside surface thereof. Specifically, the internal space is typically limited to a small volume having a length of less than 30 $mm^3$ and a cross section of 1×2 or 1×3 or 2×2 or 2×3 or 2×4 mm. In variants the shape of the limited space may be different and have a non-rectangular cross section.

The exemplary waveguide 10 has a substantially rectangular transversal cross-section have thin walls having a small height t1 and a large width t2. Typical dimensions t1×t2 are 1 mm×3 mm, 1 mm×5 mm, or for example 2 mm×6 mm, or 0.5 mm×3 mm or 0.1 mm×2 mm or 50 μm×3 mm. The height t1 if the waveguide 10 1 may be smaller than 50 μm. The waveguide 10 is preferably made of a heat resistant polymer, resisting temperatures higher than 100° C., preferably higher than 200° C. such as polyimides, Kapton or polyimide-amides. Such high-temperature resistant waveguides allow that the waveguide 10 may be in contact with the heater 3 or be close to it, typically less than 0.5 mm. The incoupler 11 is illustrated in FIG. 18 as an enhanced portion I of FIG. 17. The incoupler 11 is preferably a focusing and deflecting diffractive structure 11 allowing to incouple light and, accordingly, an image of at least a portion of the indicium into the waveguide. The focusing incoupler 11 has a focal length chosen so that a direct image is formed at the end of the waveguide 10. As the waveguide 10 is thinner than wider (i.e. t1<<t2), and, depending on the angular aperture of the guided beam 100, total internal reflection may occur only between the large sides 10', 10" of the waveguide 10. In variants, at least one dielectric or absorbing coating may be applied to the thin walls. In variants the incoupler 11 and/or the outcoupler 13 may provide focusing only in a vertical plane The outcoupling part O of the system of FIG. 17 is illustrated in FIG. 19. The outcoupler 13 may be a rectangular sized outcoupler 13 having lateral dimensions 13*a*, 13*b*. The lateral dimensions 13*a*, 13*b* may be typically 1 mm×3 mm, 1 mm×3 mm, 2 mm×3 mm, 3 mm×3 mm, 3 mm×4 mm.

Providing an optical magnification system in such thin space is impossible, unless it is extremely small, i.e. smaller than 1 mm, which however then does not allow to image macroscopic sized coded indicia such as indicia made of 0.2-0.5 mm wide barcodes. As illustrated in the enhanced view in FIG. 18, using a flexible waveguide, as promoted by the invention, allows for one or both ends of the waveguide 10 to be bent so that the incoupler 11 and/or outcoupler 13 is arranged into a predetermined position, such as an alignment of the incoupler 11 parallel or in contact with a wall 2*a*' or aperture of the cavity 2*a*.

In order to withstand high temperatures, the waveguide 10 is preferably made of a high curing polysiloxane, which allows to obtain low optical losses of less than 0.02 db/cm at 850 nm. Polysiloxane waveguides are highly flexible and have stable optical properties up to 290° C. and losses at 290° C. are typically less than 0.6 dB/cm. An alternative as described is the use of polyamide-imide polymers to fabricate the waveguide 10.

In variants, a heater 3 made be etched over a length, to provide a channel, and of a heat-resistant material such as $Al_2O_2$ fused silicon or glass or sol-gel, or any heat-resistant polymer as describe herein may be fixed in the channel and be used as a waveguide 10 to transfer optical information from one side of a heater to another side of the heater.

Example 2: Deposited Waveguides 10

In another exemplary realization, not illustrated in Figures, a waveguide 10 may be deposited on a surface of an element of the device, by a suitable deposition process. For example, the waveguide 10 may be printed by inkjet printing on a ring that surrounds at least partially a portion of the cavity. In other examples, a heater 3 may comprise a deposited waveguide 10. The waveguide 10 may be deposited in for example an etched length of a heater 3, or in an etched length of any component of the device 2

The invention claimed is:

1. An aerosol-generating system comprising:

an aerosol generating article extending along a longitudinal axis and comprising at least one indicium containing information about the article arranged on a surface thereof, and an aerosol-generating device comprising:

- a cavity having an opening configured to receive the aerosol generating article,
- a heater arranged about the cavity to heat said aerosol generating article after insertion thereof in the cavity,
- an optical reader system comprising at least one optical detector,
- a power supply unit, and
- a control unit configured to control at least the heater and the optical reader system, wherein said optical reader system is configured to illuminate said indicium in said cavity with a light beam, said optical reader system including at least one waveguide having an incoupling surface and an outcoupling surface, said waveguide being configured to transmit at least a reflected light beam from said indicium to said outcoupling surface to outcouple said reflected light beam to said at least one optical detector, and wherein said optical detector is located a distance away from the heater and is configured to be maintained at a temperature lower than 100° C. during operation of the heater.

2. The aerosol-generating system according to claim 1, wherein an incoupling structure is arranged at the incoupling surface.

3. The aerosol-generating system according to claim 2, wherein an outcoupling structure is arranged at the outcoupling surface.

4. The aerosol-generating system according to claim 3, wherein at least a portion of said incoupling structure and/or said outcoupling structure is selected from the group consisting of: a diffractive structure, a flat or curved wedged portion of the waveguide, an array of microprisms, a hologram layer, a metasurface, an electrostatic addressable micromirror or microshutter array, a lens, and a mirror.

5. The aerosol-generating device system according to claim 4, wherein said incoupling structure and/or said outcoupling structure is configured for focusing and/or deviating, in at least one plane, a light beam incident on said incoupling structure and/or said outcoupling structure.

6. The aerosol-generating system according to claim 3, wherein said incoupling structure and/or said outcoupling structure is an achromatic structure providing the same incoupling and outcoupling efficiency, respectively, and/or focusing in a spectral band of at least 50 nm.

7. The aerosol-generating system according to claim 3, wherein said incoupling structure and/or said outcoupling structure has a focal length equal or greater than a length of the waveguide.

8. The aerosol-generating system according to claim 3, wherein said incoupling structure and/or said outcoupling structure has a focal length smaller than a length of the waveguide, and wherein focusing structures are arranged on at least one side of the waveguide, said focusing structures being configured as relay structures to transmit an image from at least a portion of said indicium to the outcoupling surface or out of the waveguide to a distance from the output surface.

9. The aerosol-generating system according to claim 1, wherein said waveguide is an optical fiber or an optical fiber bundle.

10. The aerosol-generating system according to according to claim 1, wherein said waveguide is a flat optical waveguide.

11. The aerosol-generating system according to claim 1, wherein an optical focusing element is arranged between said cavity and said incoupling surface.

12. The aerosol-generating system according to claim 11, wherein said optical focusing element is monolithically integrated into or onto said waveguide.

13. The aerosol-generating system according to claim 1, wherein at least a portion of said waveguide is configured to transmit light, provided by an emitter, to said indicium.

14. The aerosol-generating system according to claim 1, wherein at least a portion of said waveguide is realized on at least one of surface of the heater.

15. The aerosol-generating system according to claim 1, wherein at least one optical filter is arranged between said outcoupling surface and said detector, and/or between said cavity and said incoupling surface.

16. The aerosol-generating system according to claim 1, wherein an optical spectrometer is arranged between said outcoupling surface and said detector.

17. A method for authenticating a consumable article using the aerosol-generating system according to claim 1, comprising the steps of:

inserting at least a portion of the aerosol generating article comprising the indicium in the cavity of the aerosol generating device, illuminating the indicium on the surface of the aerosol generating article with the light beam and collecting the reflected light beam from the indicium through the waveguide and guiding said reflected light beam to the optical detector of the optical reader system, authenticating the aerosol generating article, via the control unit, by computing information contained in the reflected light impinging on the optical detector.

18. The method according to claim 17, further comprising a step of commanding the heater with the control unit based on the information computed in the authentication step.

19. An aerosol-generating system comprising:

an aerosol generating article extending along a longitudinal axis and comprising at least one indicium containing information about the article arranged on a surface thereof, and an aerosol-generating device comprising:

a cavity having an opening configured to receive the aerosol generating article, a heater arranged about the cavity to heat said aerosol generating article after insertion thereof in the cavity, an optical reader system comprising at least one optical detector, a power supply unit, and a control unit configured to control at least the heater and the optical reader system, wherein said optical reader system is configured to illuminate said indicium in said cavity with a light beam, said optical reader system including at least one waveguide having an incoupling surface and an outcoupling surface, said waveguide being configured to transmit at least a reflected light beam from said indicium to said outcoupling surface to outcouple said reflected light beam to said at least one optical detector, and wherein a portion of the waveguide has stable optical properties up to about 300° C.

20. An aerosol-generating system comprising:

an aerosol generating article extending along a longitudinal axis and comprising at least one indicium containing information about the article arranged on a surface thereof, and an aerosol-generating device comprising:

a cavity having an opening configured to receive the aerosol generating article, a heater arranged about the cavity to heat said aerosol generating article after insertion thereof in the cavity, an optical reader system comprising at least one optical detector, a power supply unit, and a control unit configured to control at least the heater and the optical reader system, wherein said optical reader system is configured to illuminate said indicium in said cavity with a light beam, said optical reader system including at least one waveguide having an incoupling surface and an outcoupling surface, said waveguide being configured to transmit at least a reflected light beam from said indicium to said outcoupling surface to outcouple said reflected light beam to said at least one optical detector, and wherein said waveguide has a flexible portion.

* * * * *